(12) United States Patent
Resch et al.

(10) Patent No.: US 9,047,218 B2
(45) Date of Patent: Jun. 2, 2015

(54) DISPERSED STORAGE NETWORK SLICE NAME VERIFICATION

(75) Inventors: Jason K. Resch, Chicago, IL (US); John Quigley, Chicago, IL (US); Wesley Leggette, Oak Park, IL (US)

(73) Assignee: Cleversafe, Inc., Chicago, CA (US)

( * ) Notice: Subject to any disclaimer, the term of this patent is extended or adjusted under 35 U.S.C. 154(b) by 1144 days.

(21) Appl. No.: 13/021,510

(22) Filed: Feb. 4, 2011

(65) Prior Publication Data
US 2011/0264989 A1   Oct. 27, 2011

Related U.S. Application Data

(60) Provisional application No. 61/327,921, filed on Apr. 26, 2010.

(51) Int. Cl.
| | |
|---|---|
| *H03M 13/00* | (2006.01) |
| *G06F 11/10* | (2006.01) |
| *G06F 17/30* | (2006.01) |
| *G06F 11/07* | (2006.01) |
| *G06F 21/60* | (2013.01) |
| *G06F 11/14* | (2006.01) |
| *G06F 21/62* | (2013.01) |
| *G06F 21/64* | (2013.01) |

(Continued)

(52) U.S. Cl.
CPC ...... *G06F 11/1092* (2013.01); *G06F 17/30575* (2013.01); *G06F 11/0751* (2013.01); *G06F 11/1004* (2013.01); *G06F 11/1076* (2013.01); *G06F 21/60* (2013.01); *G06F 21/70* (2013.01); *G06F 11/2094* (2013.01); *G06F 11/0727* (2013.01); *G06F 11/076* (2013.01); *G06F 11/0763* (2013.01); *G06F 11/1464* (2013.01); *G06F 2211/1028* (2013.01); *G06F 21/6218* (2013.01); *G06F 21/64* (2013.01); *H04L 9/085* (2013.01)

(58) Field of Classification Search
CPC ..................................... H03M 13/1105
USPC .................. 714/758, 770, 781, 799
See application file for complete search history.

(56) References Cited

U.S. PATENT DOCUMENTS

| 4,092,732 A | 5/1978 | Ouchi | |
|---|---|---|---|
| 5,454,101 A * | 9/1995 | Mackay et al. ........................ | 1/1 |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Esaw Abraham
(74) *Attorney, Agent, or Firm* — Garlick & Markison; Timothy W. Markison

(57) ABSTRACT

A method begins by a processing module dispersed storage error encoding data to produce a plurality of sets of encoded data slices in accordance with dispersed storage error coding parameters. The method continues with the processing module determining a plurality of sets of slice names corresponding to the plurality of sets of encoded data slices. The method continues with the processing module determining integrity information for the plurality of sets of slice names and sending the plurality of sets of encoded data slices, the plurality of sets of slice names, and the integrity information to a dispersed storage network memory for storage therein.

10 Claims, 23 Drawing Sheets

(51) Int. Cl.
*H04L 9/08* (2006.01)
*G06F 21/70* (2013.01)
*G06F 11/20* (2006.01)

(56) References Cited

U.S. PATENT DOCUMENTS

| | | | |
|---|---|---|---|
| 5,485,474 A | 1/1996 | Rabin | |
| 5,774,643 A * | 6/1998 | Lubbers et al. | 714/20 |
| 5,802,364 A * | 9/1998 | Senator et al. | 719/325 |
| 5,809,285 A * | 9/1998 | Hilland | 703/25 |
| 5,890,156 A | 3/1999 | Rekieta et al. | |
| 5,987,622 A * | 11/1999 | Lo Verso et al. | 714/6.1 |
| 5,991,414 A * | 11/1999 | Garay et al. | 713/165 |
| 6,012,159 A * | 1/2000 | Fischer et al. | 714/755 |
| 6,058,454 A | 5/2000 | Gerlach et al. | |
| 6,128,277 A * | 10/2000 | Bruck et al. | 370/221 |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

\* cited by examiner

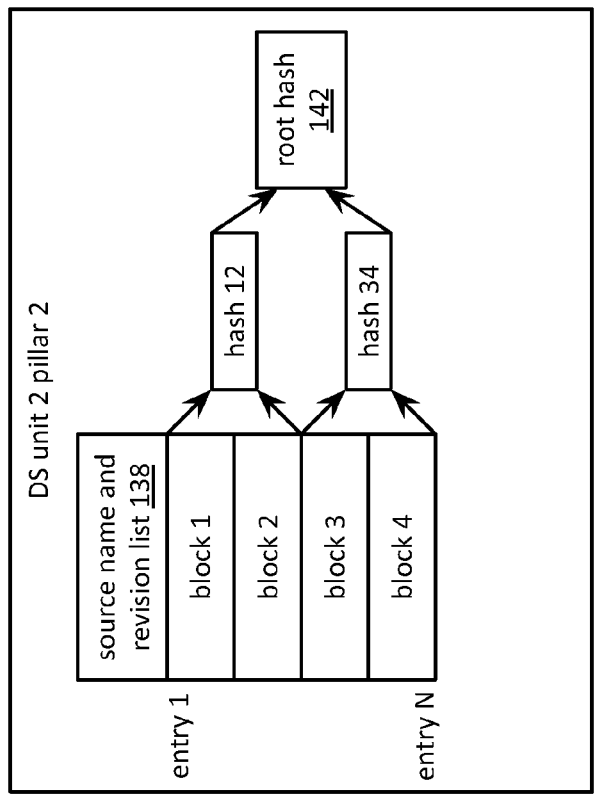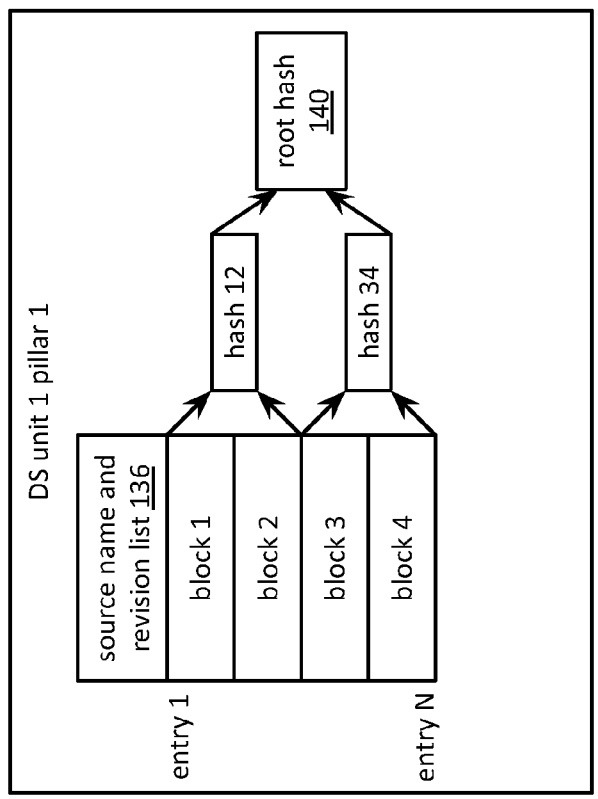
FIG. 8

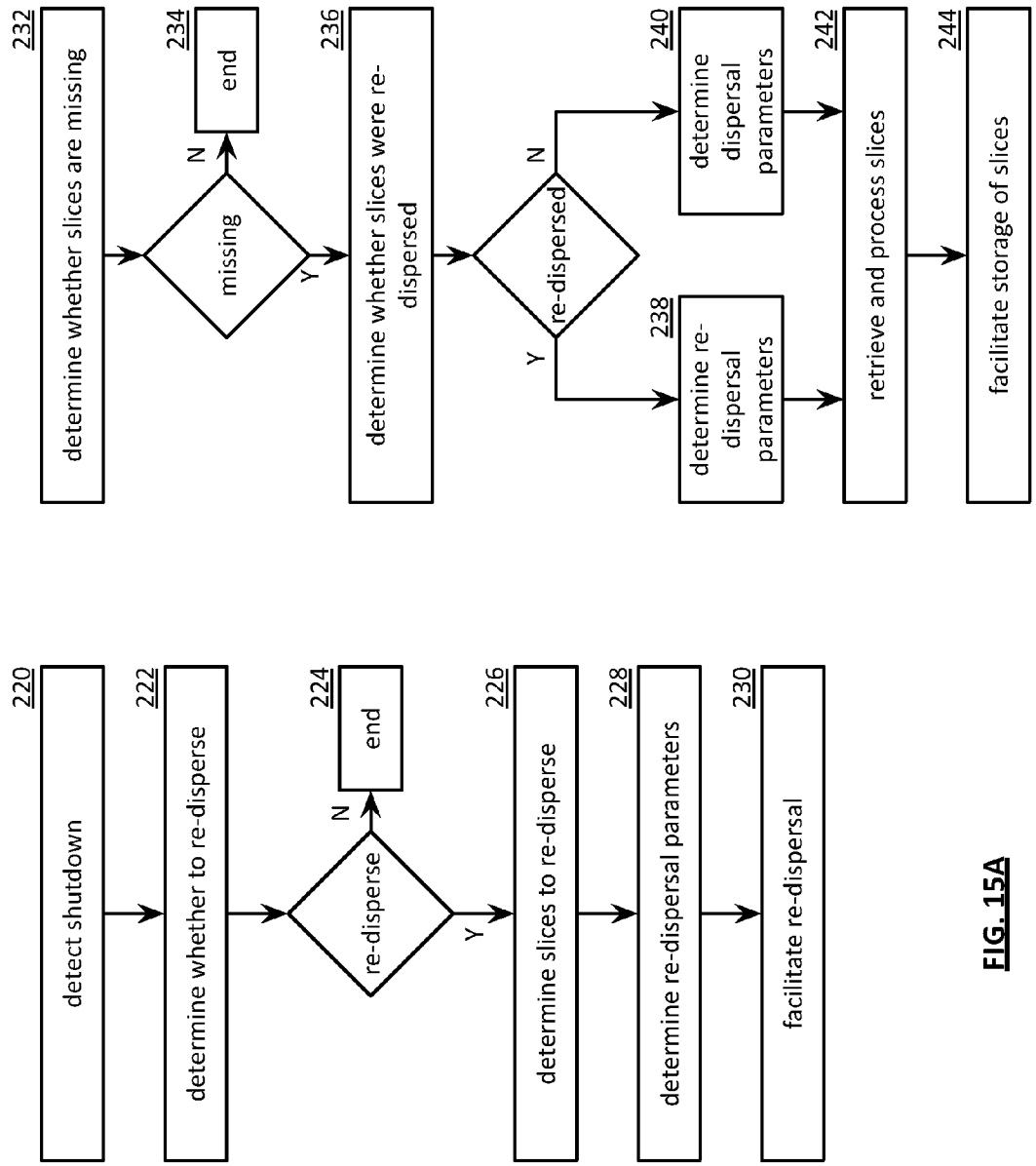

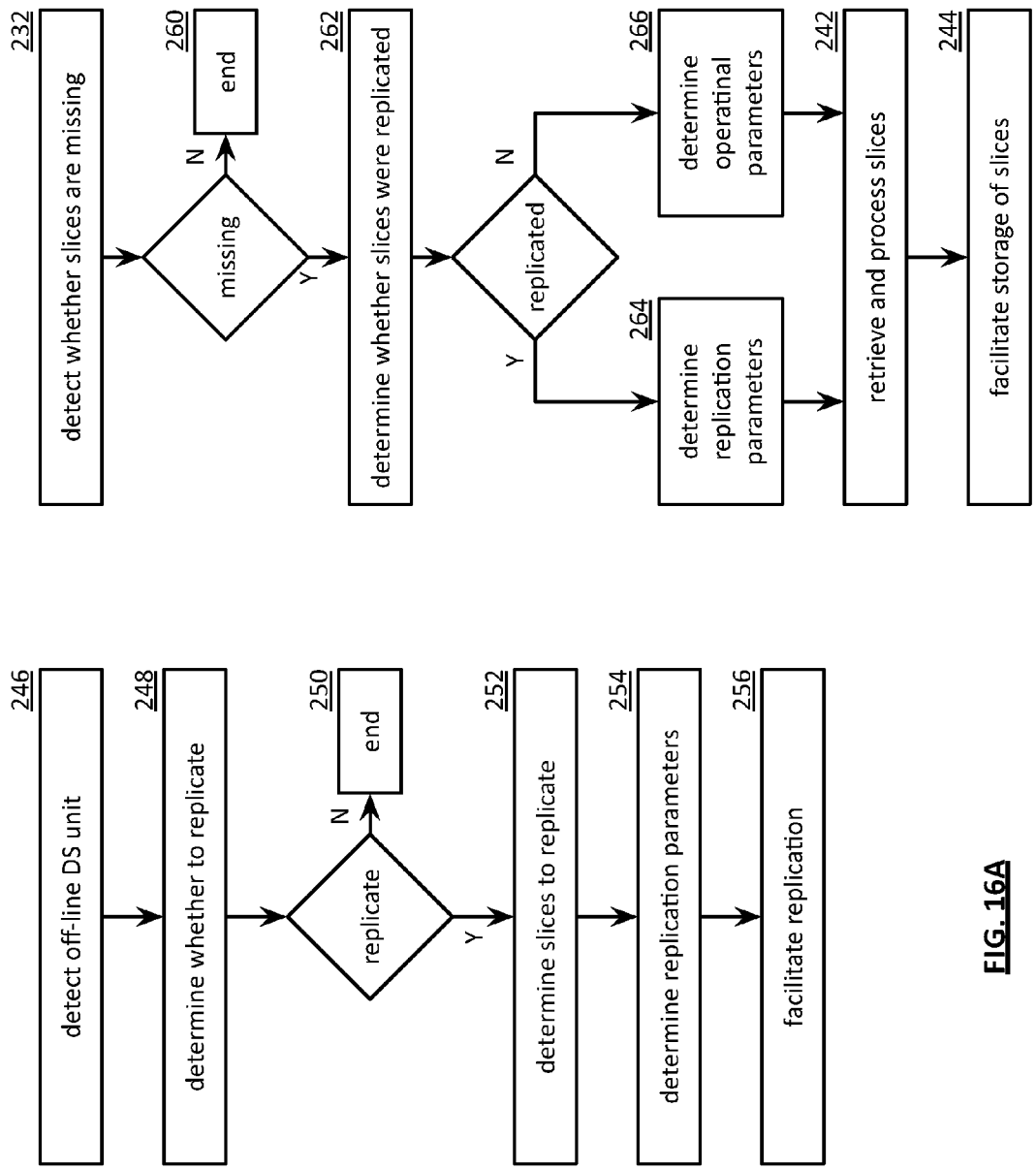

DISPERSED STORAGE NETWORK SLICE NAME VERIFICATION

CROSS REFERENCE TO RELATED PATENTS

This patent application is claiming priority under 35 USC §119(e) to a provisionally filed patent application entitled "SYSTEM ACCESS AND DATA INTEGRITY VERIFICATION IN A DISPERSED STORAGE SYSTEM,", having a provisional filing date of Apr. 26, 2010, and a provisional Ser. No. 61/327,921, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 8 is a diagram of an example of a hash tree structure in accordance with the invention;

FIG. 15A is a flowchart illustrating an example of re-dispersing an encoded data slice in accordance with the invention;

FIG. 15B is a flowchart illustrating another example of migrating data in accordance with the invention;

FIG. 16A is a flowchart illustrating an example of replicating an encoded data slice in accordance with the invention;

FIG. 16B is a flowchart illustrating another example of migrating data in accordance with the invention;

DETAILED DESCRIPTION OF THE INVENTION

Figure 1:
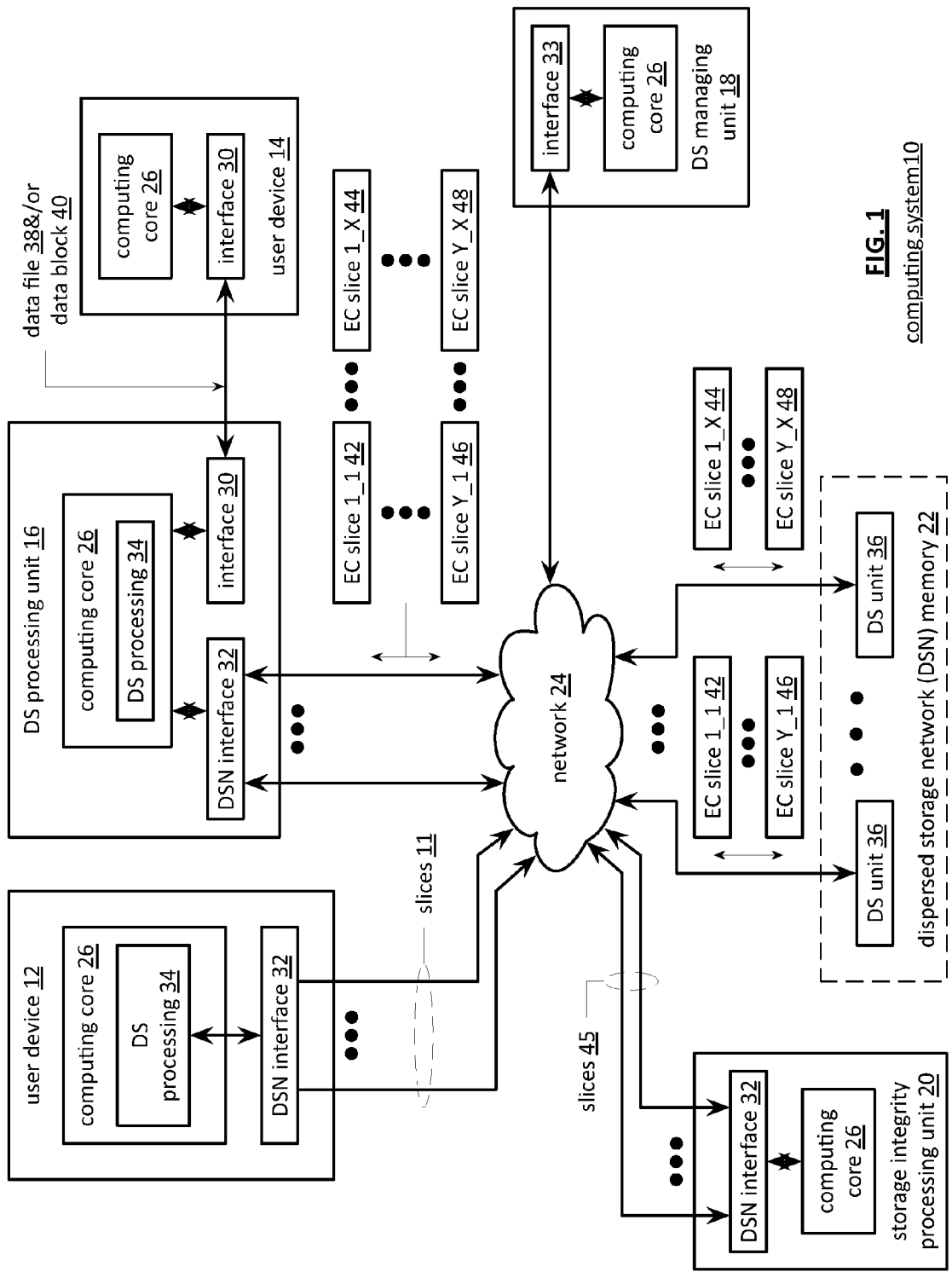
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-24.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-24.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the user device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
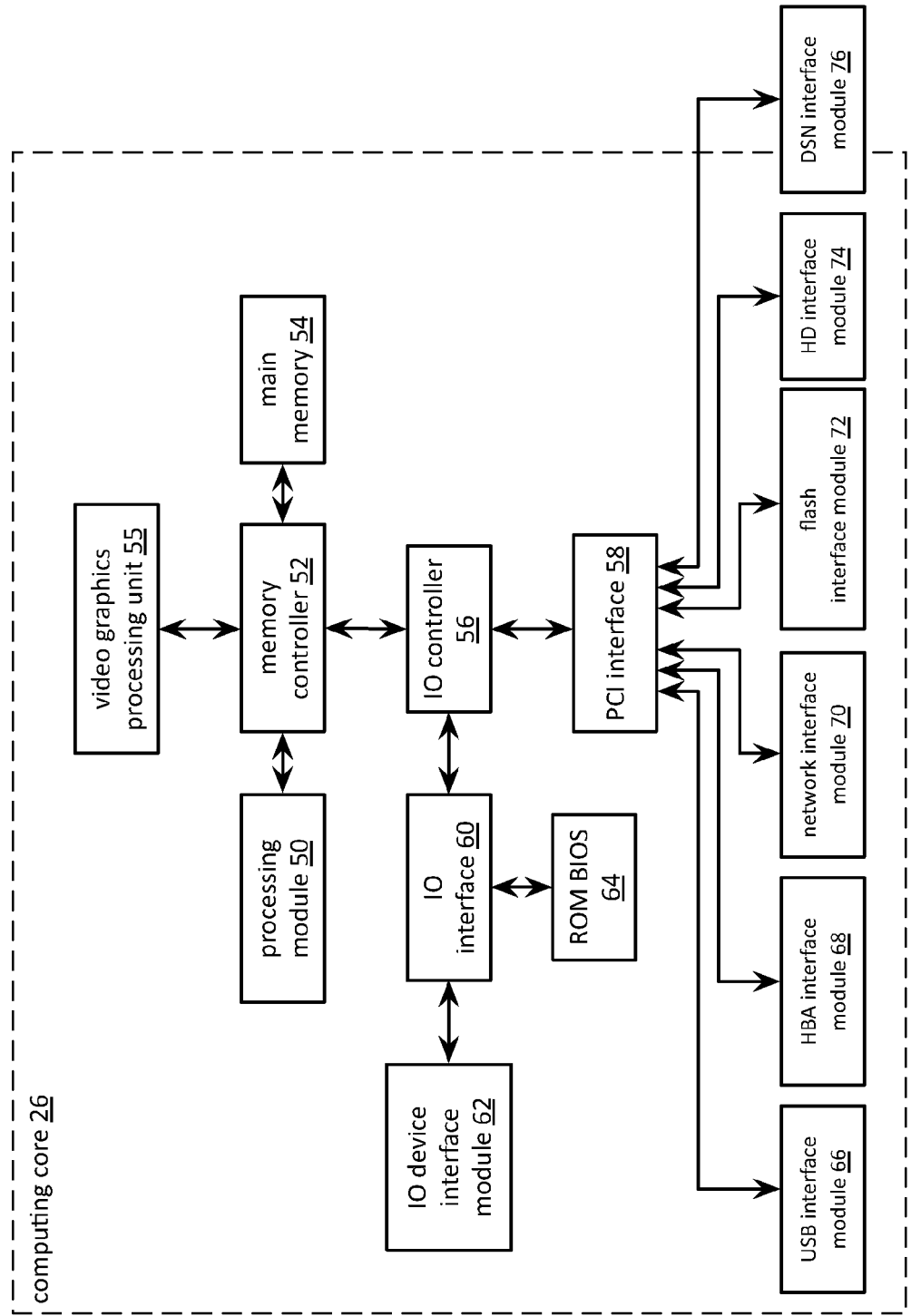
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-24.

Figure 3:
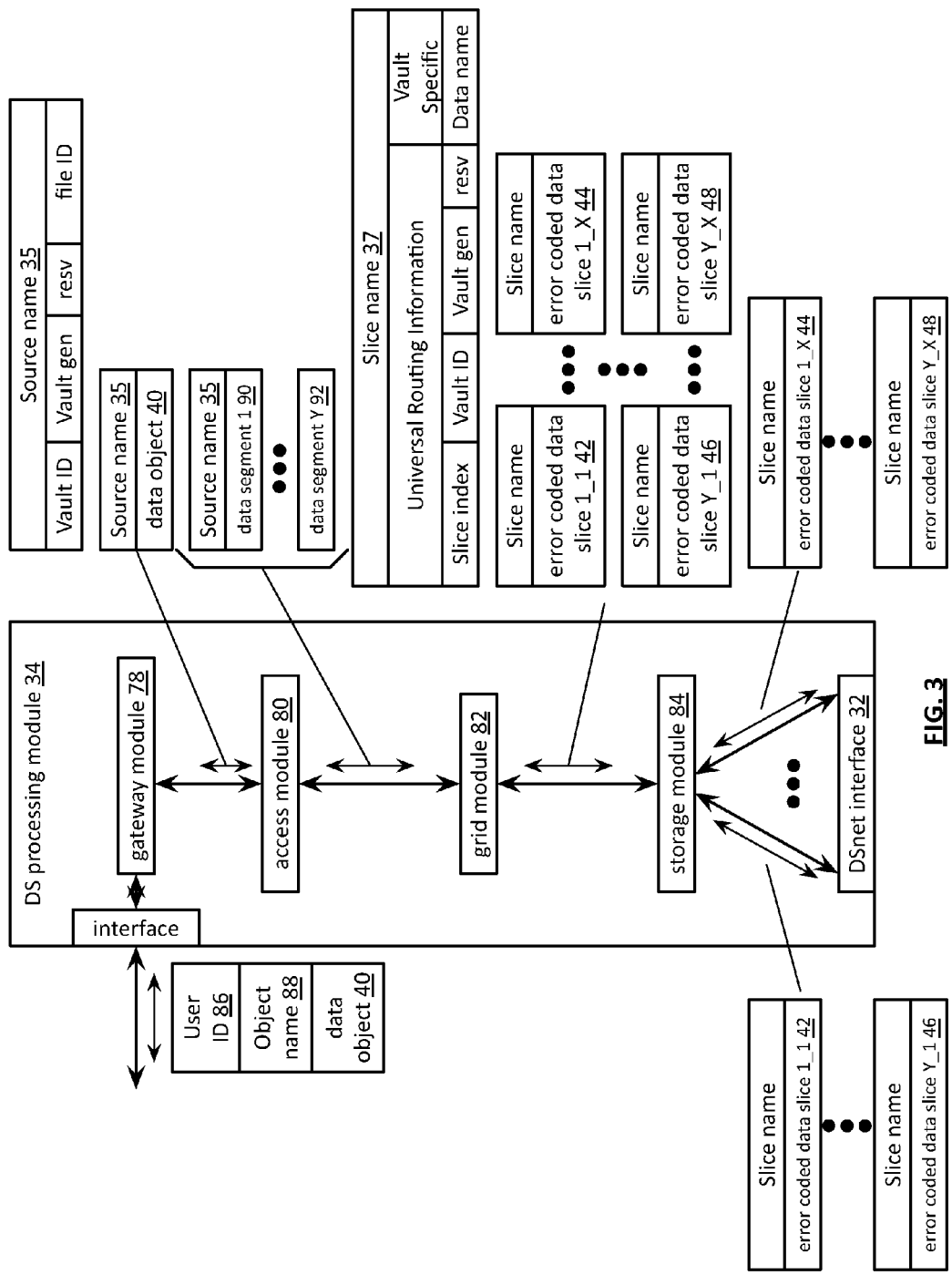
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
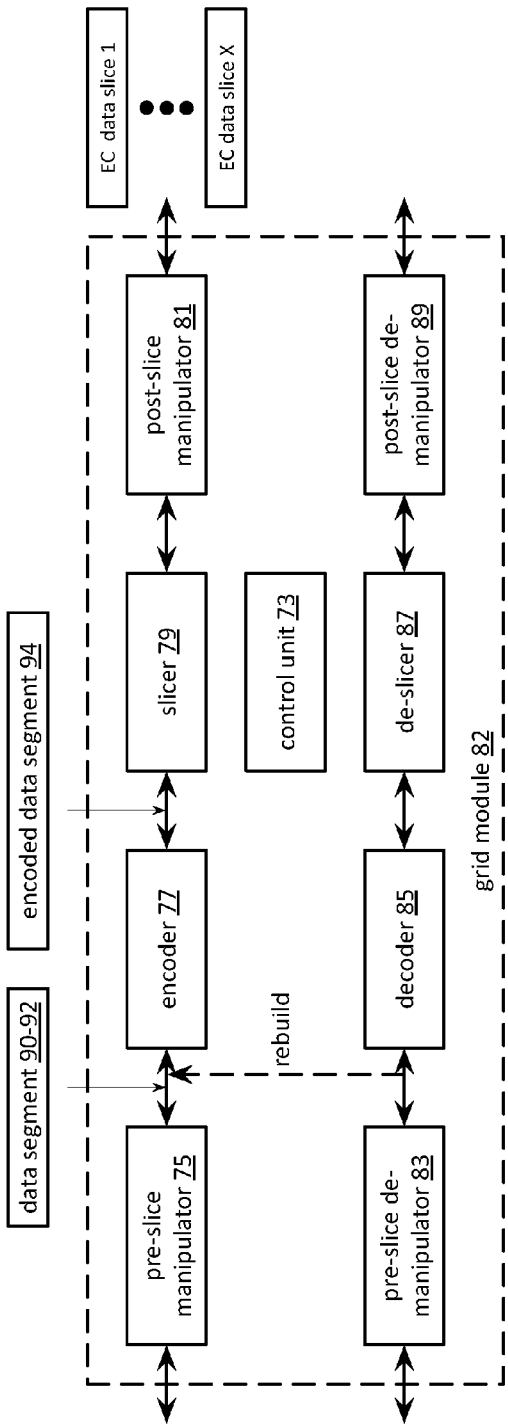
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
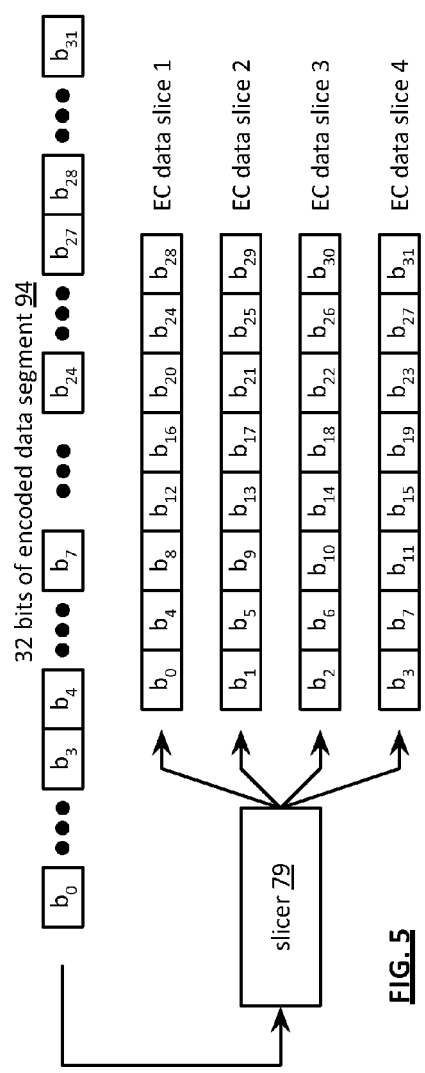
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
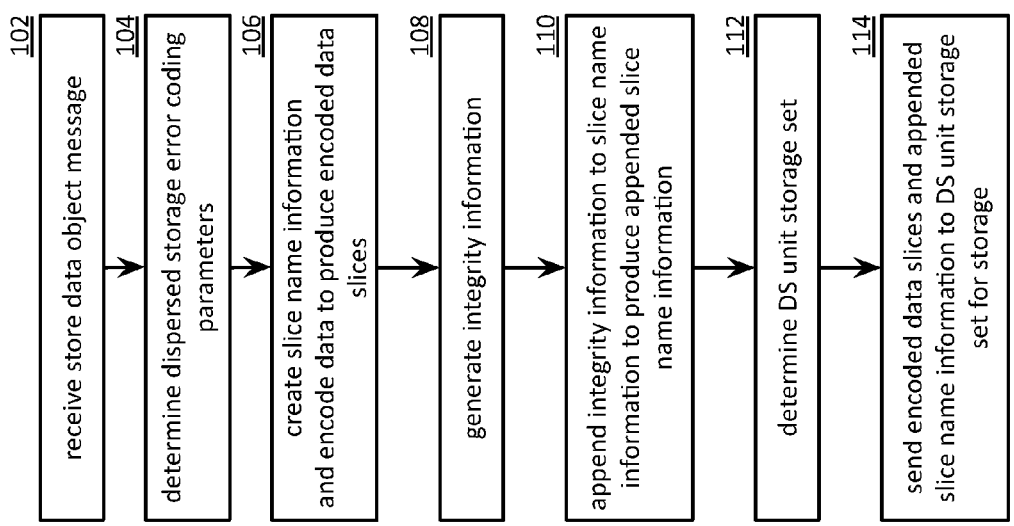
FIG. 6 is a flowchart illustrating an example of generating integrity information in accordance with the invention.

FIG. 6 is a flowchart illustrating an example of generating integrity information. The method begins at step 102 where a processing module receives a store data object message. Such a store data object message may include one or more of data, a user identifier (ID), a request, a data ID, a data object name, a data object, a data type indicator, a data object hash, a vault ID, a data size indicator, a priority indicator, a security indicator, and a performance indicator. The method continues at step 104 where the processing module determines dispersed storage error coding parameters (e.g., operational parameters) including one or more of a pillar width, a write threshold, a read threshold, an encoding method, a decoding method, an encryption method, a decryption method, a key, a secret key, a public key, a private key, a key reference, and an integrity information generation method designator. Such a determination may be based on one or more of information received in the store data object message, the user ID, the data ID, a vault lookup, a list, a command, a message, and a predetermination.

The method continues at step 106 where the processing module dispersed storage error encodes data to produce a plurality of sets of encoded data slices in accordance with the dispersed storage error coding parameters. In addition, the processing module determines a plurality of sets of slice names corresponding to the plurality of sets of encoded data slices; where a slice name includes one or more of a slice index, a vault ID, a generation, an object number, and a segment number. Within a slice name, the slice index indicates a pillar number of a pillar width associated with the dispersed storage error coding parameters, the vault ID indicates a storage resource of a storage system common to one or more user devices, the generation indicates portions of a corresponding vault, the object number is associated with the data ID (e.g., a hash of the data ID), and the segment number indicates a segment identifier associated with one of a plurality of data segments (e.g., the plurality of data segment constitutes the data, a data file, etc.).

The method continues at step 108 where the processing module determines integrity information for the plurality of sets of slice names. Such a determination may be in accordance with one or more integrity methods. In a first integrity method, the processing module generates individual integrity information for at least some of the slice names of at least some of the plurality of sets of slice names (e.g., at a slice name level) and generates the integrity information based on the individual integrity information. The individual integrity information may be generated by performing one or more of a hash function, cyclic redundancy check, encryption function, an encrypted digital signature function (e.g., digital signature algorithm (DSA), El Gamal, Elliptic Curve DSA, Rivest, Shamir and Adleman (RSA)), and parity check on a slice name of the at least some of the slices names of at least some of the plurality of sets of slices names to generate the individual integrity information. The hash function may include a hashed message authentication code (e.g., secure hash algorithm 1 (SHA1), hashed message authentication code message digest algorithm 5 (HMAC-MD5)) that uses a shared key and the encryption function includes an encryption algorithm that utilizes a private key, which is paired to a public key. In an example of generating individual integrity information, the processing module calculates a hash of at least some of the slice names and then encrypts the hash in accordance with an encryption method to produce an encrypted digital signature.

In a second integrity method, the processing module generates set integrity information for a set of slice names of at least some of the plurality of sets of slice names (e.g., at a set level) and generates the integrity information based on the set integrity information. The set integrity information may be generated by performing one or more of the hash function, the cyclic redundancy check, the encryption function, the encrypted digital signature function, and the parity check on the set of slice names of at least some of the plurality of sets of slice names to generate the set integrity information.

In a third integrity method, the processing module generates pillar integrity information for a pillar set of slice names of at least some of the plurality of sets of slice names (e.g., at a pillar level) and generates the integrity information based on the pillar integrity information. The pillar integrity information may be generated by performing one or more of the hash function, the cyclic redundancy check, the encryption function, the encrypted digital signature function, and the parity check on the pillar set of slice names of at least some of the plurality of sets of slice names to generate the pillar integrity information.

In a fourth integrity method, the processing module generates data file integrity information for at least some of the plurality of sets of slice names (e.g., at the data file level) and generates the integrity information based on the data file integrity information. The data file integrity information may be generated by performing one or more of the hash function, the cyclic redundancy check, the encryption function, the encrypted digital signature function, and the parity check on the at least some of the plurality of sets of slice names to generate the data file integrity information.

In a fifth integrity method, the processing module generates combined integrity information for at least some of the encoded data slices of the plurality of sets of encoded data slices and for at least some of the slices names of at least some of the plurality of sets of slice names and generates the integrity information based on the combined integrity information. The combined integrity information includes performing one or more of the hash function, the cyclic redundancy check, the encryption function, the encrypted digital signature function, and the parity check on two or more of an encoded data slice of the at least some of the encoded data slices of the plurality of encoded data slices, a revision identifier, and an associated slice name of the at least some of the slice names of the plurality of sets of slice names to generate the combined integrity information. For example, the processing module performs an RSA encrypted digital signature on a combination of an encoded data slice and an associated slice name to generate the combined integrity information. As another example, the processing module performs a HMAC function on a set of combinations of encoded data slices and associated slice names name to generate the combined integrity information. As yet another example, the processing module performs a DSA encrypted digital signature on a combination of an encoded data slice, an associated slice name, and an associated revision identifier to generate the combined integrity information.

The integrity information may be generated as a combination of the various methods. For example, the processing module performs the first integrity method, the fourth integrity method, and at least one of the second and third integrity methods to generate the integrity information.

The method continues at step 110 where the processing module appends the integrity information to the slice name information to produce appended slice name information. For example, the processing module appends a HMAC digest to the slice name, revision, and date of a single encoded data slice. The method continues at step 112 where the processing module determines a dispersed storage (DS) unit storage set. Such a determination may be based on one or more of information received in the store data object message, a vault lookup, a list, a command, a message, a predetermination, the dispersed storage error coding parameters, encoded data slices, a dispersed storage network (DSN) memory status indicator, the slice name information, a virtual DSN address to physical location table lookup, and the integrity information. The method continues at step 114 where the processing module sends the plurality of sets of encoded data slices, the plurality of sets of slice names, and the integrity information to a DSN memory for storage therein.

Figure 7:
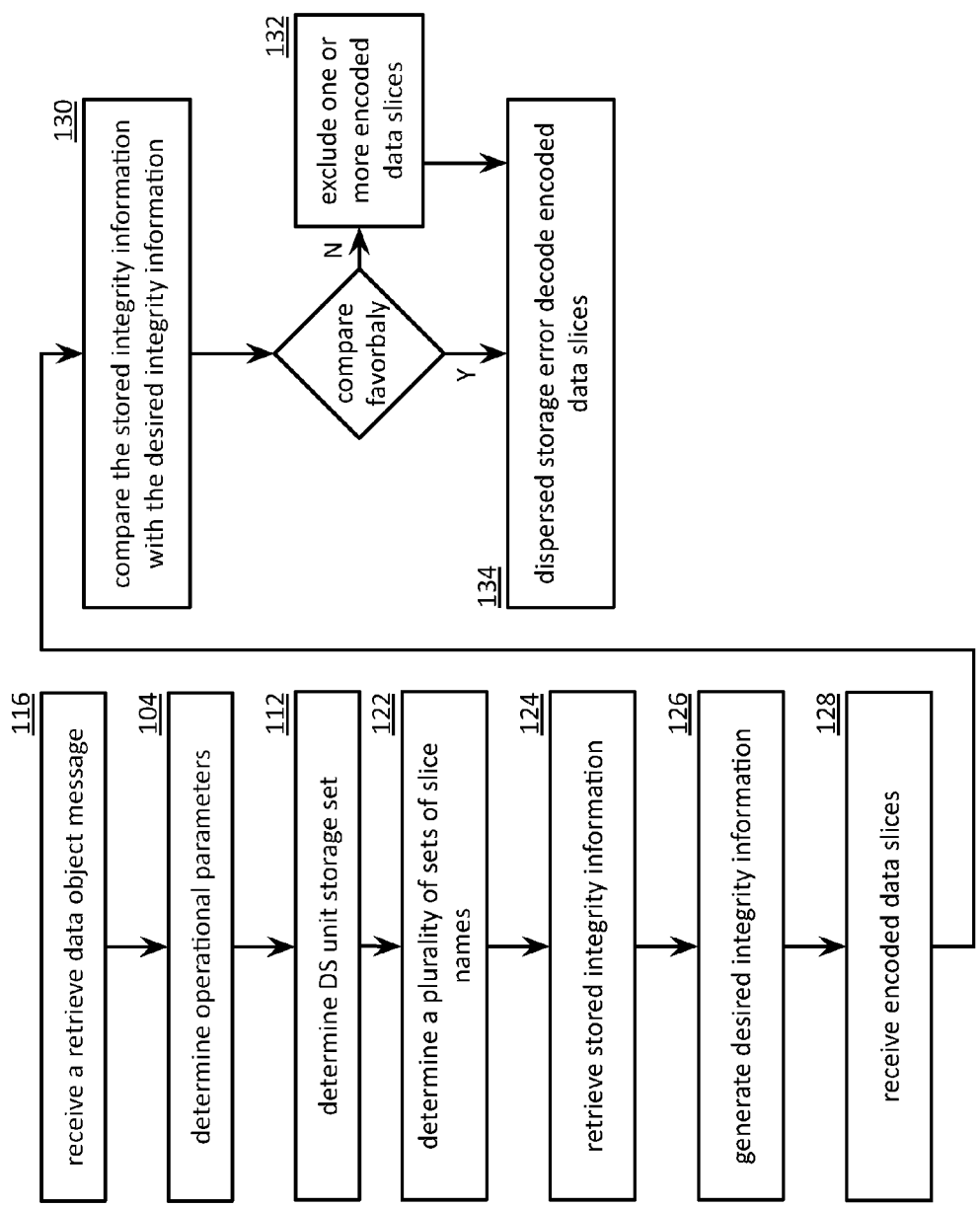
FIG. 7 is a flowchart illustrating an example of verifying slice integrity in accordance with the invention.

FIG. 7 is a flowchart illustrating an example of verifying slice integrity, which includes similar steps to FIG. 6. The method begins with step 116 where a processing module receives a data retrieval request. Such a data retrieval request includes one or more of a retrieve data object request, a user identifier (ID), a data object name, a data ID, a data type indicator, a data object hash, a vault ID, a data size indicator, a priority indicator, a security indicator, and a performance indicator. The method continues with step 104 of FIG. 6 where the processing module determines dispersed storage error coding parameters (e.g., operational parameters) and with step 112 of FIG. 6 where the processing module determines a dispersed storage (DS) unit storage set.

The method continues at step 122 where the processing module determines a plurality of sets of slice names in accordance with the data retrieval request. Such a determination may be based on one or more of the data ID, the user ID, the vault ID, the dispersed storage error coding parameters, and extraction of a data size indicator from a reproduced data segment. The method continues at step 124 where the processing module receives stored integrity information corresponding to the data retrieval request. For example, the processing module sends one or more stored integrity information request messages to the DS unit storage set and receives the stored integrity information in response, wherein the stored integrity information request messages include at least some of the plurality of sets of slice names. Note that the stored integrity information and associated encoded data slices were previously stored in the DS unit storage set.

The method continues at step 126 where the processing module generates desired integrity information based on the plurality of sets of slice names. Such a generation of the desired integrity information may be based on one or more of the five integrity methods discussed with reference to FIG. 6.

The method continues at step 128 where the processing module receives encoded data slices. For example, the processing module sends encoded data slice retrieval messages to the DS unit storage set that includes at least some of the plurality of sets of slice names and receives the encoded data slices in response. The method continues at step 130 where the processing module compares the stored integrity information with the desired integrity information. For example, the processing module decrypts the stored integrity information using a public key of a public-private key pair to produce at least some of a plurality of sets of reconstructed slice names and compares corresponding slices names of the plurality of sets of slice names with the at least some of a plurality of sets of reconstructed slice names when the stored integrity information includes encrypted slice names (e.g., a digital signature, encrypted slice names) encrypted with a private key of the super public-private key pair.

As another example of comparing at step 130, the processing module decrypts the stored integrity information using a shared key to produce the at least some of the plurality of sets of reconstructed slice names and compares corresponding slice names of the plurality of sets of slice names with the at least some of the plurality of sets of reconstructed slice names when the stored integrity information includes encrypted slice names encrypted with the shared key. The processing module compares the stored integrity information directly to the desired integrity from a when the stored integrity information includes results of a hash function (e.g., a HMAC).

As yet another example of comparing at step 130, when multiple integrity methods are used (e.g., the fourth integrity and the second or third integrity methods), a higher level comparison is performed first (e.g., use the forth integrity method). If it is successful, the method continues based on a favorable comparison. If, however, the higher level comparison was not successful, a lower level comparison is performed (e.g., the second or third integrity method). For sets of encoded data slices that the lower level comparison was successful, the method continues based on a favorable comparison. For the sets of encoded data slices that the lower level comparison was not successful, an error is generated or another comparison may be performed based on the individual integrity information.

As a specific example, an integrity check is initially performed for the data file. If successful, the method continues with decoding the plurality of sets of encoded data slices to recapture the data file (e.g., step 134). If the data file level integrity check was not successful, then a set level integrity check is performed to identify which sets have an error. For each set having an error, an individual encoded slice name integrity check may be performed to identify encoded data slices having an error. The encoded data slices having an error or sets including slices having an error may be excluded from the decoding (e.g., step 132). Even if encoded data slices have an error, as long as a decode threshold number of encoded data slices per set are available, then the data file can be accurately reproduced.

FIG. 8 is a diagram of an example of a hash tree structure for two pillars of slice storage in a dispersed storage network (DSN) memory. An individual hash tree comprises three or more layers including a source name and revision list layer 136-138, at least one hash value layer (e.g., hash 12, hash 34), and a root hash layer 140-142. The source name and revision list layer 136-138 includes entries 1-N. Such entries 1-N may include a plurality of blocks 1-4. Note that there may be any number of blocks. Such blocks may include source names and revision numbers of encoded data slices stored in a dispersed storage (DS) unit associated with a common pillar. A hash value layer includes one or more hash values (e.g., hash 12, hash 34), wherein the hash values are calculated over one or more of the blocks 1-4. For example, hash 12 includes a hash value over the source name and revision list entries corresponding to blocks 1 and 2. As another example, hash 34 represents a hash value over the source name and revision list entries corresponding to blocks 3 and 4. The root hash layer 140-142 includes a hash value, wherein the hash value is calculated over hash values of a preceding hash value layer. For example, root hash 140-142 includes a hash value over hash 12 and hash 34. Note that any number of hash value layers may be utilized in the hash tree structure.

The root hash 140 and the root hash 142 yield substantially the same value when the same hash tree structure is utilized for each of the pillars and when there are no encoded data slice storage errors (e.g., missing slices, out of date slices, etc.). Note that a source name associated with a first pillar of a set of encoded data slices is substantially the same as a source name associated with a second pillar of the set of encoded data slices (e.g., same vault identifier (ID), same generation, same object number, and same segment number). Note that a slice error associated with a pillar may be identified by comparing a hash value associated with the pillar to hash values associated with one or more other pillars.

In an example of slice error identification where a DS unit storage set includes DS units 1-2 associated with pillars 1-2, each DS unit calculates an associated hash tree structure creating a plurality of hash tree structures. Next, a processing module of any one of a DS processing unit, a user device, a DS managing unit, a storage integrity processing unit, and any DS unit retrieves one or more hash values of the plurality of hash tree structures, compare the hash values, and determines that a DS unit has slice errors when the comparison indicates hash values that are not substantially the same. The processing module may compare hash values traversing similar branches of the plurality of hash tree structures further and further until reaching a lowest hash value layer where those hash values are over entries of the source name and revision list 136-138 that are not substantially the same. The processing module may also choose a different set of hash values in a same layer to compare when a different previously compared set of hash values compared favorably to facilitate traversing the hash tree structure to the lowest layer to identify the block(s) and/or list entries that correspond to a slice error.

Figure 9:
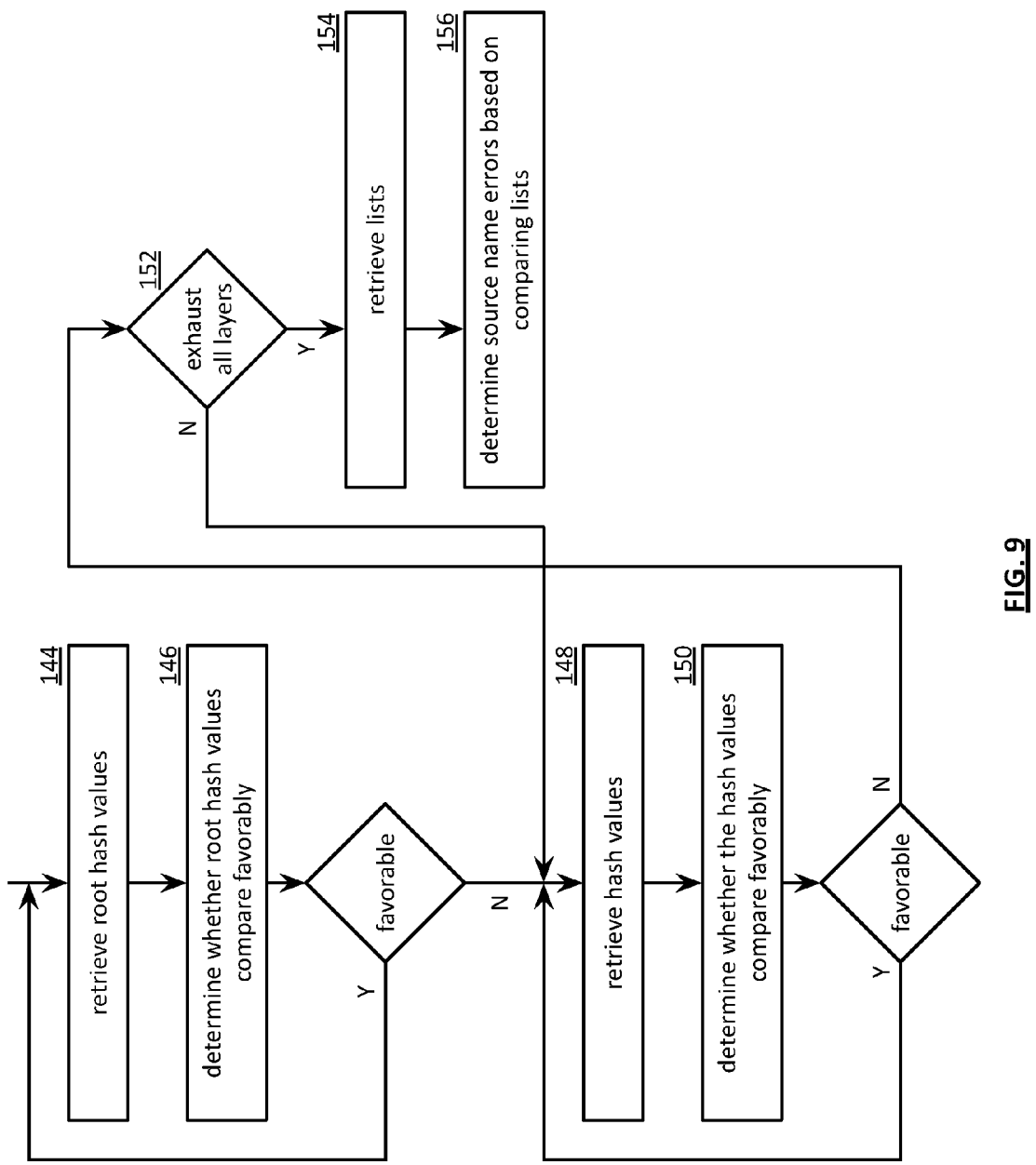
FIG. 9 is a flowchart illustrating an example of identifying slice errors in accordance with the invention.

FIG. 9 is a flowchart illustrating an example of identifying slice errors. The method begins at step 144 where a processing module retrieves root hash values from at least two pillars of a common dispersed storage (DS) unit storage set. Note that the processing module may determine which DS unit storage set based on one or more of a list, a predetermination, where comparison testing left off last time, an error message, and a command. The processing module sends a retrieve root hash value message to the DS units associated with the two or more pillars. For example, the processing module sends a retrieve root hash value message to all of n DS units (e.g., n=pillar width) associated with all pillars of the DS unit storage set. Next, the processing module receives n root hash values from the DS units.

The method continues at step 146 where the processing module determines whether the root hash values compare favorably to each other. For instance, the same level root hash values compare favorably when the root hash values are substantially the same (e.g., when there are no differences in the source name and revision lists). The method repeats back to step 144 when the processing module determines that the root hash values compare favorably. The method continues to step 148 one the processing module determines that the root hash values unfavorably (e.g., one or more slice errors exist).

The method continues at step 148 where the processing module determines a next layer down from the root hash values in accordance with a hash tree structure. The processing module determines the next layer down when a plurality of hash values are associated with the next layer down. Such a next layer down may be a first portion of a plurality of root hash values when the processing module initially retrieves root hash values from a next layer. Note that a portion may be a second or greater portion of a plurality of root hash values when the processing module is retrieving root hash values from a next layer where the processing module has previously retrieved root hash values from a different portion of a plurality of root hash values from a same layer.

The method continues at step 150 where the processing module determines whether the hash values compare favorably to each other. The method repeats back to step 148 when the hash values compare favorably such that the processing module continues retrieving hash values from different portions of the same layer until all portions of the same layer have been compared. Note that at least one portion of a layer of root hash values compares unfavorably when a previous comparison at a higher layer indicated an unfavorable comparison. The method continues to step 152 when the processing module determines that the hash values compare unfavorably.

At step 152 the processing module determines whether comparison testing has exhausted all layers in accordance with the hash tree structure to isolate a portion of a list associated with a slice error. The method repeats back to step 148 when the processing module determines that all of layers have not been exhausted. The method continues to step 154 when the processing module determines that all of the layers have been exhausted. At step 154 where the processing module retrieves source name and revision list entries from two or more DS units corresponding to the block(s) covered by a hash value comparison that was unfavorable. The method continues at step 156 where the processing module determines source name errors based on comparing retrieved list entries. Note that errors are indicated when the list entries are not substantially the same and that the processing module may retrieve a same entry from substantially all pillars of the DS unit storage set to determine information of a majority and a minority of the list entries. For example, the processing module verifies a slice error in DS unit 3 when all DS units returned a value that was identical except for an entry from DS unit 3.

Figure 10B:
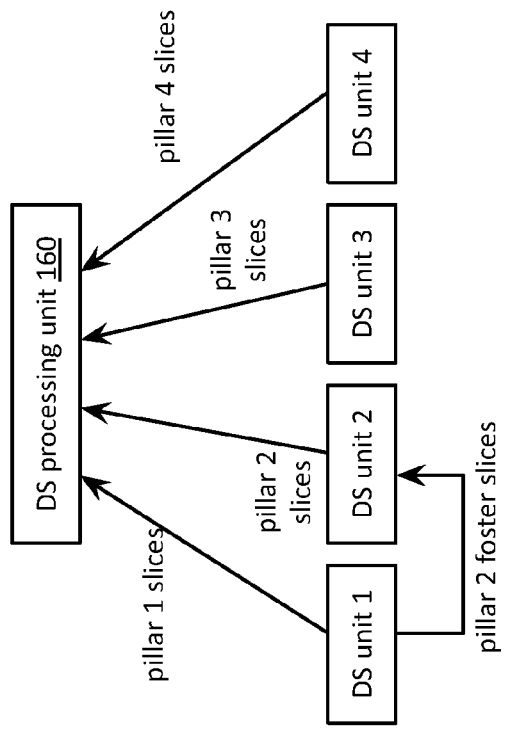
FIG. 10B is a schematic block diagram of another embodiment of a computing system in accordance with the invention.
Figure 10A:
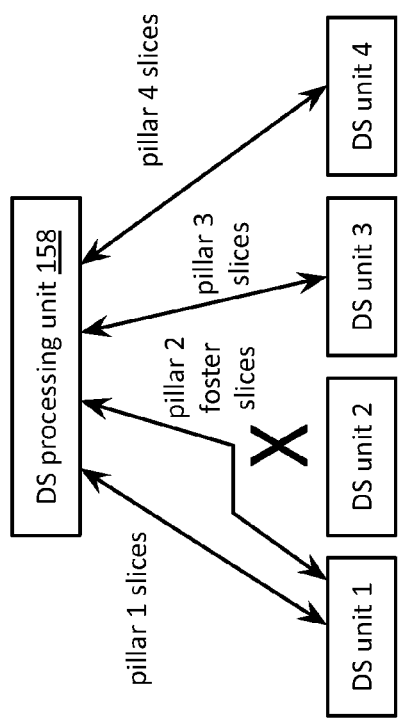
FIG. 10A is a schematic block diagram of another embodiment of a computing system in accordance with the invention.

FIGS. 10A-10B are schematic block diagrams of another embodiment of a computing system where each includes a dispersed storage (DS) processing unit 158-160 and a DS unit storage set that includes DS units 1-4. In a storage example, DS unit 1 is utilized to store pillar 1 slices, DS unit 2 stores pillar 2 slices, DS unit 3 stores pillar 3 slices, and DS unit 4 stores pillar 4 slices.

FIG. 10A represents a scenario where DS unit 2 is not available to the DS processing unit 158 (e.g., DS unit 2 has failed, the network to DS unit 2 is not operational, and/or DS unit 2 is in a maintenance cycle). In such a scenario, the DS processing unit 158 utilizes the other three DS units 1, 3, and 4 to store and retrieve slices in this DS unit storage set. Successful operation may not be possible when one more of the other three DS units 1, 3, and 4 fails in a system where the pillar width is 4 and the decode threshold is 3.

In an example of operation, DS processing unit 158 detects that DS unit 2 is unavailable, creates foster slices for pillar 2 (e.g., for subsequent data segments to be stored in the DS unit storage set), determines an alternative DS unit as DS unit 1 to store the foster slices, and send the foster slices to DS unit 1 to temporarily store the foster slices while DS unit 2 remains unavailable. Note that foster slices includes slices that are normally stored in a second DS unit associated with a second pillar such that the foster slices are at least temporarily stored in a first DS unit that is normally associated with a first pillar where the first and second DS units are different and the first and second pillars a different. The DS processing unit 158 retrieves the foster slices from the alternative DS unit (e.g., DS unit 1) when the DS processing unit 158 determines to retrieve slices normally associated with the DS unit that is not available. Note that the DS processing unit 158 may send foster slices for storage to two or more alternative DS units.

FIG. 10B represents a scenario where DS unit 2 transitions from unavailable to available. The DS processing unit 160 facilitates moving foster slices from the one or more alternative DS units (e.g., DS unit 1) to the DS unit that has just transitioned from unavailable to available (e.g., to store the slices that DS unit 2 missed while it was not available). Alternatively, one or more of the alternative DS units that contains foster slices determines that a DS unit that is associated with at least some of the foster slices has just transitioned from unavailable to available. The one or more of the alternative DS units may facilitate moving at least some of the foster slices from the one or more of the alternative DS units to the DS unit that has just transitioned from unavailable to available. Next, the DS processing unit 160 retrieves the pillar 2 slices from DS unit 2 for the slices stored previous to the available to unavailable transition of DS unit 2 and for the slices stored while DS unit 2 was unavailable. The method to create, store, and retrieve foster slices is discussed in greater detail with reference to FIG. 11A-11B.

Figure 11B:
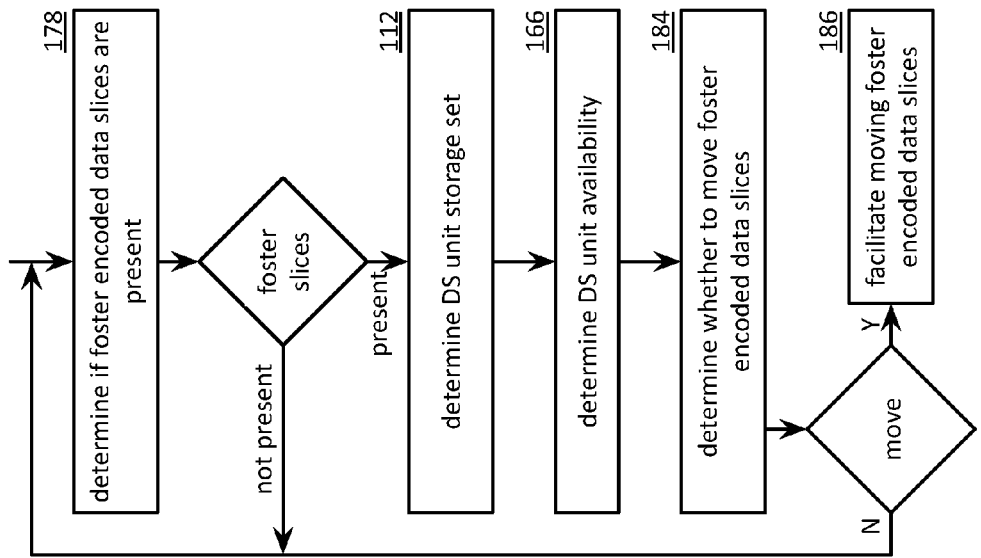
FIG. 11B is a flowchart illustrating an example of migrating data in accordance with the invention.
Figure 11A:
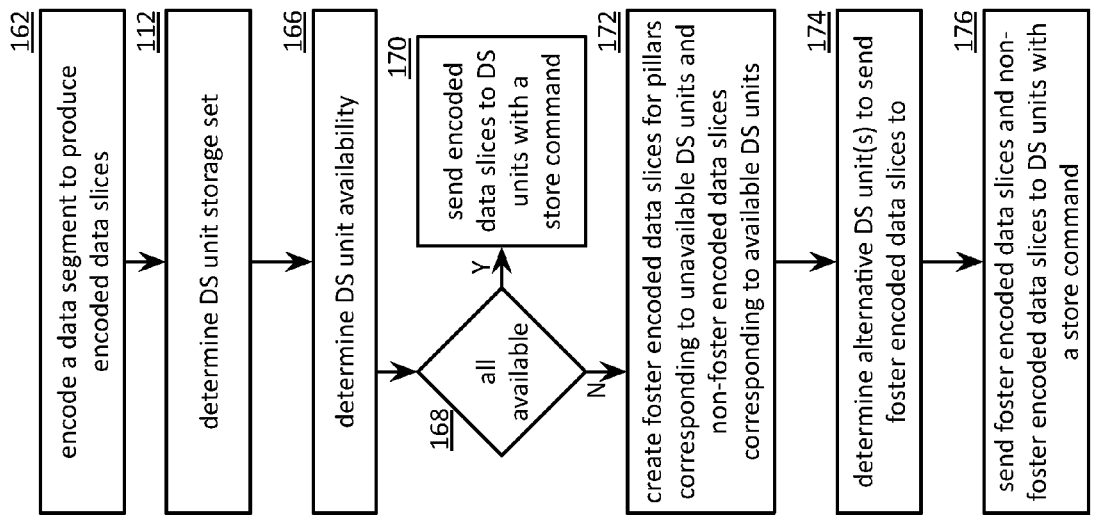
FIG. 11A is a flowchart illustrating an example of storing data in accordance with the invention.

FIG. 11A is a flowchart illustrating an example of storing data, which includes similar steps to FIG. 6. The method begins with step 162 where a processing module dispersed storage error encodes a data segment to produce a set of encoded data slices. The method continues at step 112 of FIG. 6 to determine DS units of the DS unit storage. The method continues at step 166 where the processing module determines DS unit availability based on one or more of a query, a list, a command, an error message, and a message. Note that the DS unit availability may be a function of network availability to a site location associated with the DS unit and/or operational health of the DS unit. The method continues at step 168 where the processing module determines whether all DS units of the DS unit storage set are available. The method branches to step 172 when the processing module determines that all of the DS units are not available. The method continues to step 170 when the processing module determines that all of the DS units are available. At step 170, the processing module sends the set of encoded data slices to the DS unit storage set for storage therein.

The method continues at step 172 where the processing module creates foster encoded data slices for pillars corresponding to unavailable DS units and the processing module creates non-foster encoded data slices corresponding to the available units for remaining pillars. For example, the foster encoded data slices may be substantially the same as the encoded data slices created previously for those pillars that are not available. The method continues at step 174 where the processing module determines alternative DS units to send the foster encoded data slices to for storage based on one or more of a query, a list, a command, a message, available DS units of the DS unit storage set, a proximity of the alternative DS unit to the unavailable DS unit, performance history of the alternative DS unit, and reliability history of the alternative DS unit. The method continues at step 176 where the processing module sends the foster encoded data slices to the alternative DS units with a store command to at least temporarily store the foster encoded data slices. The processing module sends the non-foster encoded data slices to the other available DS units with a store command to store the non-foster encoded data slices.

FIG. 11B is a flowchart illustrating an example of migrating data, which includes similar steps to FIGS. 6 and 11A. The method begins with step 178 were a processing module determines if foster encoded data slices are present based on one or more of a query, a list, a command, and a message. For example, the processing module searches for foster slices in a present dispersed storage (DS) unit associated with the processing module or in one or more other DS units by sending a query and receiving a query response from the other DS unit. The method repeats back to step 178 when the processing module determines that foster slices are not present. The method continues to step 180 when the processing module determines that foster slices are present.

The method continues at step 112 of FIG. 6 to determine DS units of the DS unit storage. The method continues with step 166 of FIG. 11A to determine DS unit availability of the DS unit associated with the foster slices. The method continues with step 184 where the processing module determines whether to move foster encoded data slices based on the DS unit availability and/or a determination comparing present DS units storing foster slices and different candidate DS units. In such a scenario, the processing module determines whether to move the foster encoded data slices to a DS unit where they normally would be stored (e.g., the same pillar) or whether to move the foster encoded data slices from a first temporary DS unit to a second temporary DS unit where the second temporary DS unit is a better choice. For example, the processing module determines to move the foster encoded data slices from a first temporary DS unit to a second temporary DS unit when the second temporary DS unit has a better reliability history than the first temporary DS unit.

As another example, the processing module determines to move the foster encoded data slices from the first temporary DS unit to the DS unit normally associated with the pillar of the foster encoded data slices (e.g., the normal DS unit for this pillar). The method repeats back to step 178 when the processing module determines not to move foster encoded data slices. The method continues to step 186 wherein the processing module determines to move foster encoded data slices. At step 186, the processing module facilitates moving the foster encoded data slices. Note that moving the foster encoded data slices may include sending a retrieval command to DS units storing the foster encoded data slices, receiving the foster encoded data slices, determining a new DS unit to move the foster encoded data slices to, sending the foster encoded data slices to the new DS unit with a store command to store the foster encoded data slices, and sending a delete slice command to the DS units that were storing the foster encoded data slices to delete the foster encoded data slices.

Figure 12A:
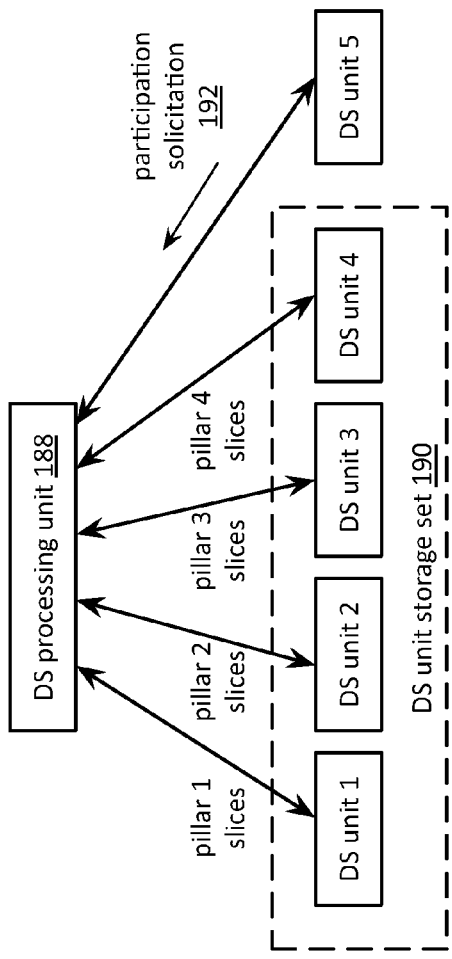
FIG. 12A is a schematic block diagram of another embodiment of a computing system in accordance with the invention.
Figure 12B:
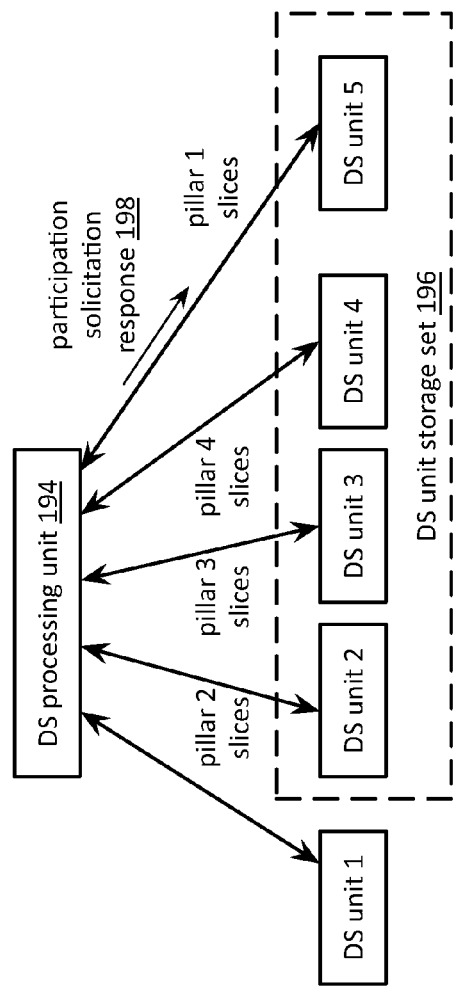
FIG. 12B is a schematic block diagram of another embodiment of a computing system in accordance with the invention.

FIGS. 12A-12B are schematic block diagrams of another embodiment of a computing system that includes a dispersed storage (DS) processing unit 188, 194, a DS unit storage set 190 that includes four DS units (e.g., DS units 1-4 in FIG. 12A and DS units 2-5 in FIG. 12B), and at least one other DS unit that is not included in the DS unit storage set 190, 196 (e.g., DS unit 5 in FIG. 12A and DS unit 1 in FIG. 12B).

FIG. 12A represents the computing system where the DS processing unit 188 sends slices for storage to DS units 1-4 of DS unit storage set 190. Note that DS unit 1 is utilized to store pillar 1 slices, DS unit 2 stores pillar 2 slices, DS unit 3 stores pillar 3 slices, and DS unit 4 stores pillar 4 slices. Note that DS unit 5 is not part of the DS unit storage set 190. Note that DS units outside of the DS unit storage set 190 may determine to provide storage resources to a DS processing unit 188. Such a determination may be based on one or more of DS unit memory capacity, DS unit memory utilization, DS unit availability, network status relative to a DS unit, a request, a query, a command, a message, a predetermination, and a change in status indicator. For example, DS unit 5 determines to send a participation solicitation message 192 to the DS processing unit 188 when DS unit 5 determines that DS unit 5 is available to store encoded data slices and that the DS unit 5 memory utilization is substantially lower than a utilization threshold. Such a participation solicitation message 192 may include one or more of a DS unit identifier (ID), a DS unit memory capacity, a DS unit memory utilization, a DS unit availability indicator, a network status relative to the DS unit indicator, a request, DS unit reliability history, DS unit performance history, DS unit cost, DS unit geographic location, DS unit affiliation with other DSN systems, and a DS unit storage set ID. The DS processing unit 188 receives the participation solicitation message and processes the message as described with reference to FIG. 12B.

FIG. 12B represents the computing system where DS processing unit 194 considers a participation solicitation message 192 from DS unit 5. The DS processing unit 194 determines whether to utilize DS unit 5 based on one or more of information in the solicitation message 192, a DS unit storage set capacity, a DS unit storage set utilization, a DS unit storage set performance indicator, a DS unit storage set reliability indicator, a command, a message, a predetermination, a list, and an error message. For example, the DS processing unit 194 determines to utilize DS unit 5 to replace DS unit 1 when the DS processing unit 194 determines that the DS unit 5 utilization and/or DS unit 5 reliability history is more favorable than similar metrics for DS unit 1. As another example, DS processing unit 194 determines not to utilize DS unit 5 when the metrics associated with DS unit 5 are not substantially more favorable than metrics associated with each of the DS units 1-4 of the DS unit storage set 190 under consideration.

The DS processing unit 194 sends a participation solicitation response 198 to DS unit 5, wherein the response includes an assignment to DS unit storage set 196 to store pillar 1 slices when the DS processing unit 194 determines to utilize DS unit 5 in favor of DS unit 1. Next, the DS processing unit 194 facilitates moving pillar 1 slices from DS unit 1 over to DS unit 5. The DS processing unit 194 updates a virtual dispersed storage network (DSN) address to physical location table to indicate that the pillar 1 slices are now stored at DS unit 5.

Figure 13:
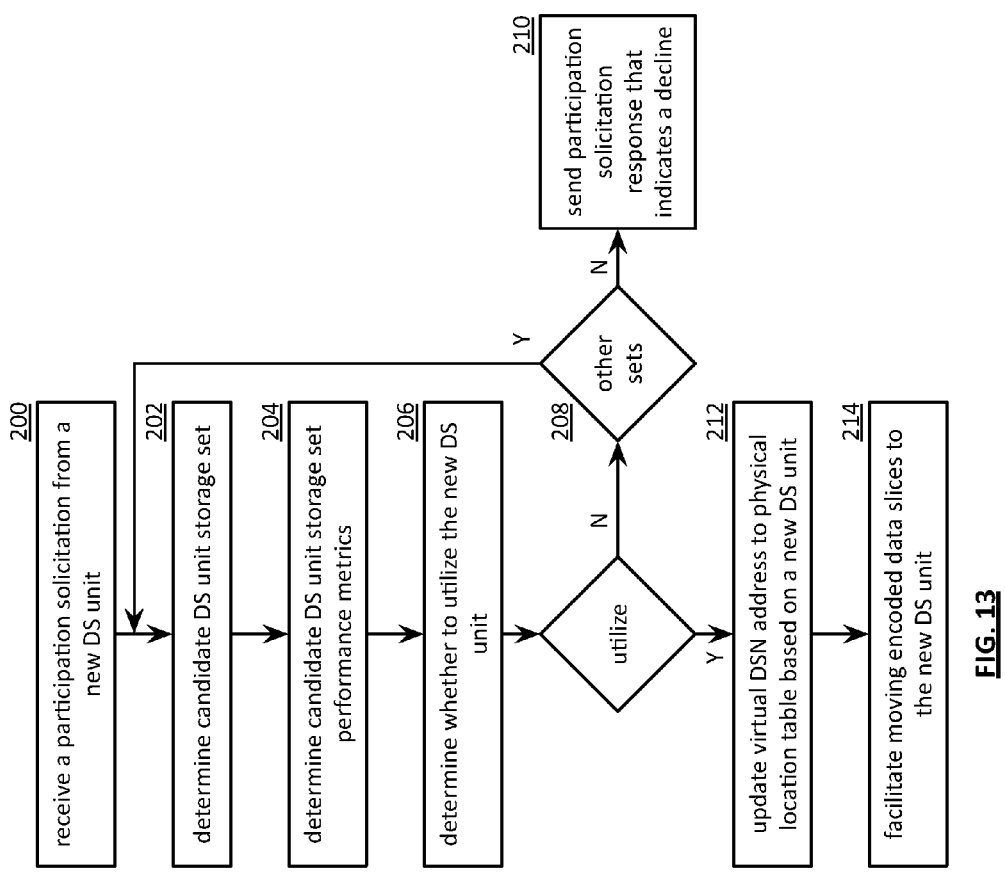
FIG. 13 is a flowchart illustrating an example of utilizing a dispersed storage unit in accordance with the invention.

FIG. 13 is a flowchart illustrating an example of utilizing a dispersed storage unit. The method begins with step 200 where a processing module receives a participation solicitation message from a new dispersed storage (DS) unit. Such a participation solicitation message may include content as discussed previously with reference to FIG. 12A. The method continues at step 202 where the processing module determines a candidate DS unit storage set based on one or more of information in the participation solicitation message, a list, a predetermination, a command, and an error message. For example, the processing module determines the DS unit storage set based on a requested DS unit storage set in the participation solicitation message. As another example, the processing module determines the DS unit storage set based on DS unit storage set performance when the DS unit storage set performance is greater than a performance threshold.

The method continues at step 204 where the processing module determines candidate DS unit storage set performance metrics, wherein such metrics may include one or more of reliability history, uptime history, performance history, cost information, access latency history, memory capacity, and memory utilization. The method continues at step 206 where the processing module determines whether to utilize the new DS unit based on one or more of information in the participation solicitation message, a list, a predetermination, a command, an error message, the candidate DS unit storage sets, and the DS unit storage set performance metrics. For example, the processing module determines to replace DS unit 1 of the DS unit storage set with DS unit 5 when DS unit 1 has unfavorable reliability performance history. The method branches to step 212 when the processing module determines to utilize the new DS unit. The method continues to step 208 when the processing module determines not utilize the new DS unit.

At step 208, the processing module determines whether there are other DS unit storage sets to consider. Such a determination may be based on one or more of a list of DS unit storage sets, DS unit storage set performance information, which DS unit storage sets have been considered so far, a command, a message, an error message, and a list. The method repeats back to step 202 when the processing module determines to consider other DS unit storage sets. The method continues to step 210 when the processing module determines not to consider other DS unit storage sets. At step 210, the processing module sends a participation solicitation response that indicates a decline to the new DS unit when the processing module determines that there are no other DS unit storage sets to consider. Note that in such a scenario, there may be no advantage to utilize the new DS unit.

The method continues at step 212 where the processing module updates a virtual dispersed storage network (DSN) address to physical location table based on the new DS unit identifier (ID). For example, the processing module replaces the reference to DS unit 1 with a reference to DS unit 5 when the processing module has determined to utilize DS unit 5 in favor of DS unit 1 for a vault and DS unit storage set. The method continues at step 214 where the processing module facilitates moving encoded data slices from a previous DS unit to the new DS unit. For example, the processing module retrieves encoded data slices from DS unit 1, sends the encoded data slices to DS unit 5 with a store command to store the encoded data slices, and sends a delete encoded data slice command to DS unit 1 when DS unit 5 indicates a confirmation that the encoded data slices have been successfully stored.

Figure 14B:
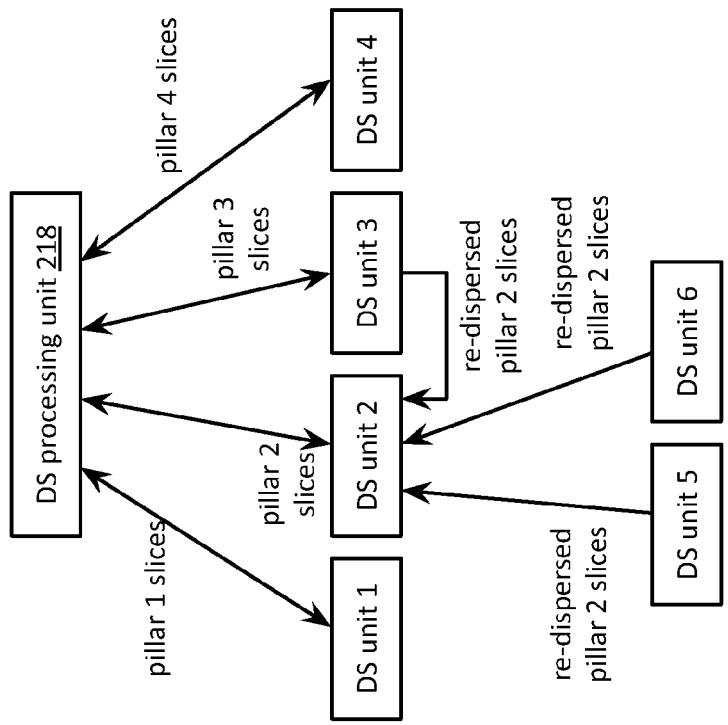
FIG. 14B is a schematic block diagram of another embodiment of a computing system in accordance with the invention.
Figure 14A:
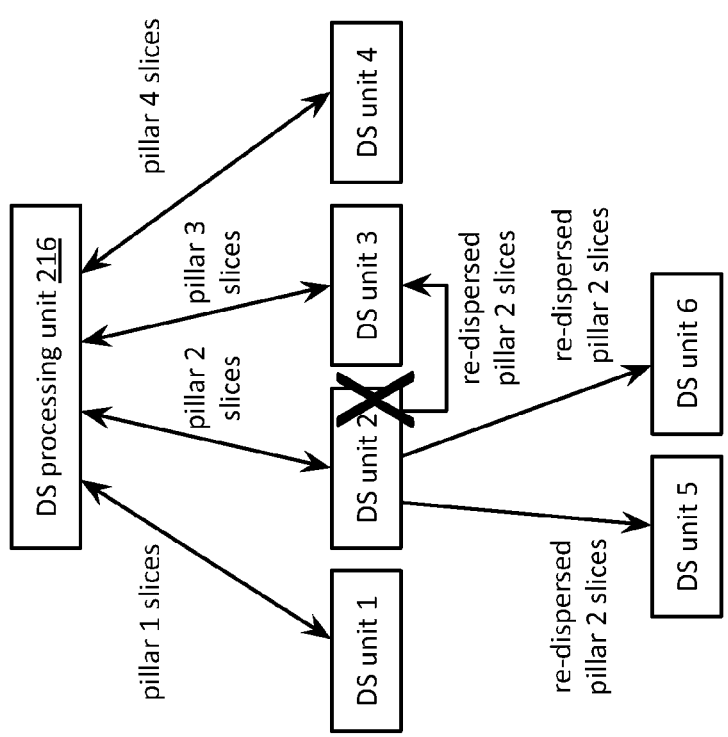
FIG. 14A is a schematic block diagram of another embodiment of a computing system in accordance with the invention.

FIGS. 14A-14B are schematic block diagrams of another embodiment of a computing system that includes a dispersed storage (DS) processing unit 216-218 and DS units 1-6. In an example of operation, the DS processing unit 216-218 utilizes DS units 1-4 as a DS unit storage set when a pillar width is 4. For instance, DS processing unit 216-218 utilizes DS unit 1 to store and/or retrieve pillar 1 encoded data slices, DS unit 2 is utilized to store pillar 2 slices, DS unit 3 is utilized to store pillar 3 slices, and DS unit 4 is utilized to store pillar 4 slices. Note that DS units 5-6 may be utilized as auxiliary DS units to temporarily store encoded data slices on behalf of any DS unit 1-4 of the DS unit storage set as discussed below.

FIG. 14A represents a scenario where DS unit 2 determines to re-disperse pillar 2 encoded data slices to one or more other DS units. Such a determination may be based on one or more of a detection of a DS unit 2 failure, detection of a DS unit 2 shutdown, detection of a DS unit 2 maintenance cycle, detection of a network failure, an error message, a power indicator, a weather indicator, an earthquake indicator, and estimated future availability indicator, a command, a message, a query, a flag, and a predetermination. Next, DS unit two determines which of the pillar 2 encoded data slices to re-disperse to at least one other DS unit from DS unit 2. Such a determination may be based on one or more of a query response, a flag, a command, a message, a predetermination, a critical information indicator, a frequency of access indicator, an estimated time complete re-dispersal indicator, a priority indicator, and a performance indicator. Next, DS unit 2 determines re-dispersal parameters (e.g., error coding dispersal storage function parameters) to utilize in a re-dispersal process. The re-dispersal parameters may include one or more of a slice format indicator, a pillar width, a write threshold, a read threshold, a decode threshold, an encoding method, a decoding method, an encryption method, a decryption method, a key, and auxiliary DS unit choices. Such a determination of the re-dispersal parameters may be based on one or more of a candidate auxiliary DS unit list, candidate auxiliary DS unit performance history information, candidate auxiliary DS unit reliability history information, a candidate auxiliary DS unit status indicator, a query response, a flag, a command, a message, a predetermination, a critical information indicator, a frequency of access indicator, an estimated time complete re-dispersal indicator, a priority indicator, and a performance indicator.

Next, DS unit 2 facilitates re-dispersal of pillar 2 encoded data slices to the auxiliary DS units (e.g., DS units 5 and 6) from DS unit 2. In an instance of replication, DS unit 2 replicates the pillar 2 encoded data slices as-is (e.g., without further encoding) when the slice format indicator indicates slices rather than sub-slices. In another instance of replication, DS unit 2 further error encodes the pillar 2 encoded data slices to produce sub-slices when the slice format indicator indicates sub-slices rather than slices. In an example of operation when the slice format indicator indicates slices, DS unit 2 retrieves a first portion of the pillar 2 encoded data slices from a memory of DS unit 2, sends the first portion of encoded data slices as re-dispersed pillar 2 slices to DS unit 3 for storage therein, and receives a confirmation message from DS unit 3 that the encoded data slices have been successfully stored in DS unit 3. Next, DS unit 2 sends a second portion of the pillar 2 encoded data slices as re-dispersed pillar 2 slices to DS unit 5 for storage therein. Next, DS unit 2 sends a third portion of the pillar 2 encoded data slices as re-dispersed pillar 2 slices to DS unit 6. Note that any portion (e.g., first, second, third) of slices may be substantially the same as any other portion of slices when the performance indicator indicates further reliability is desired.

In another example of operation when the slice format indicator indicates sub-slices, DS unit 2 retrieves a slice of the pillar 2 encoded data slices from the memory of DS unit 2, dispersed storage error encodes the slice to produce sub slices, sends the sub-slices to one or more other DS units (e.g., auxiliary DS units) for storage therein, and receives a confirmation message from the other DS units that the sub-slices have been successfully stored. Note that DS unit 2, an auxiliary DS unit 5-6, and/or the DS processing unit may maintain a virtual dispersed storage network (DSN) address to physical location table to enable the determination of a storage location of slices and/or sub-slices for a subsequent retrieval sequence. The method of operation to re-disperse slices is discussed in greater detail with reference to FIG. 15A.

FIG. 14B represents an example of operation where dispersed storage (DS) unit 2 determines whether pillar 2 encoded data slices are missing. Such a determination may be based on one or more of a query, a flag, a command, a message, a predetermination, a list, a comparison of a stored checksum to a calculated checksum, a comparison of a stored integrity test value to a re-calculated integrity test value, and a comparison of a portion of a DS unit 2 source name list to a source name list from a different DS unit of another pillar. Note that DS unit 2 may evaluate this determination based on one or more of a power up sequence detection indicator, a network restoration indicator, a maintenance cycle completion indicator, a repair complete indicator, a command, a message, a timer expiration since the last evaluation, and a predetermination.

DS unit 2 determines if slices were re-dispersed when DS unit 2 determines that encoded data slices are missing based on one or more of a flag, a command, a message, a predetermination, a list, a locally stored value, and a virtual DSN address to physical location table lookup. Next, DS unit 2 determines how and where the slices were re-dispersed. Such a determination may be based on one or more of retrieval of a slice format indicator, re-dispersal parameters, retrieval of dispersal parameters, operational parameters, an auxiliary DS unit list, a query, a command, a message, and predetermination. DS unit 2 retrieves re-dispersed slices from other DS units corresponding to the missing slices. DS unit 2 stores the re-dispersed slices in a memory of DS unit 2. Note that DS unit 2 stores the retrieved re-dispersed slices as-is when a slice format indicator indicates slices rather than sub-slices. DS unit 2 retrieves at least a decode threshold number of sub-slices from auxiliary DS units, dispersed storage error decodes the retrieved sub-slices to produce a re-created slice for storage in the memory of DS unit 2 when the slice format indicator indicates sub-slices rather than slices. DS unit 2 retrieves re-dispersed pillar 2 slices from DS unit 3 and stores the re-dispersed pillar 2 slices in the memory of DS unit 2. DS unit 2 retrieves re-dispersed pillar 2 slices from DS unit 5 and stores the re-dispersed pillar 2 slices in the memory of DS unit 2. DS unit 2 retrieves re-dispersed pillar 2 slices from DS unit 6 and stores the re-dispersed pillar 2 slices in the memory of DS unit 2. The method of operation to retrieve and store re-dispersed slices is discussed in greater detail with reference to FIG. 15B.

FIG. 15A is a flowchart illustrating an example of re-dispersing an encoded data slice. The method begins with step 220 where a processing module detects a dispersed storage (DS) unit shutdown. Such a detection may be based on one or more of a detection of a DS unit failure, detection of a DS unit power down, detection of a DS unit maintenance cycle, detection of a network failure, an error message, a power indicator, a weather indicator, an earthquake indicator, and estimated future availability indicator, a command, a message, a query, a flag, and a predetermination.

The method continues with step 222 where the processing module determines whether to re-disperse encoded data slices of the DS unit to one or more other DS units when the processing module detects the shutdown of the DS unit. Such a determination may be based on one or more of a failure type, a detection of a DS unit failure, detection of a DS unit shutdown, detection of a DS unit maintenance cycle, detection of a network failure, an error message, a power indicator, a weather indicator, an earthquake indicator, and estimated future availability indicator, a command, a message, a query, a flag, and a predetermination. For example, the processing module determines to re-disperse encoded data slices when the processing module determines that a power fluctuation may last for a time period greater than a time threshold as indicated by the power indicator. The method branches to step 226 when the processing module determines to re-disperse encoded data slices. The method ends at step 224 when the processing module determines to not re-disperse encoded data slices.

The method continues at step 226 where the processing module determines which slices of the encoded data slices to re-disperse to at least one other DS unit when the processing module determines to re-disperse encoded data slices. Such a determination may be based on one or more of a query response, a flag, a command, a message, a predetermination, a critical information indicator, a frequency of access indicator, an estimated time to complete re-dispersal indicator, a priority indicator, and a performance indicator. For example, the processing module determines to re-disperse a set of most critical slices as indicated by the critical information indicator. As another example, the processing module determines to re-disperse as many slices as possible within a timeframe indicated by the estimated time to complete re-dispersal indicator (e.g., how much time left before the DS unit is completely down and unable to transfer slices). As yet another example, the processing module determines to re-disperse encoded data slices that are accessed most often as indicated by the frequency of access indicator.

The method continues at step 228 where the processing module determines re-dispersal parameters (e.g., dispersed storage error coding parameters) to utilize in the re-dispersal process. Such re-dispersal parameters may include one or more of a slice format indicator (e.g., slices or sub-slices), a pillar width, a read threshold, a read threshold, encoding method, decoding method, an encryption method, a decryption method, a key, and auxiliary DS unit choices. Such a determination of the re-dispersal parameters may be based on one or more of a candidate auxiliary DS unit list, candidate auxiliary DS unit performance history information, candidate auxiliary DS unit reliability history information, a candidate auxiliary DS unit status indicator, a query response, a flag, a command, a message, a predetermination, a critical information indicator, a frequency of access indicator, an estimated time to complete re-dispersal indicator, a priority indicator, and a performance indicator. For example, the processing module determines the re-dispersal parameters to include a slice format indicator that indicates slices are to be transferred as slices rather than as sub-slices when the processing module determines that time to complete the re-dispersal is relatively short which may prevent creating sub-slices. As another example, the processing module determines the re-dispersal parameters to include a particular auxiliary DS unit, wherein the auxiliary DS unit has an above average performance history as indicated by the candidate auxiliary DS unit performance history information.

The method continues at step 230 where the processing module facilitates re-dispersal of encoded data slices to the auxiliary DS units. For example, the processing module replicates the encoded data slices as-is (e.g., without further encoding) for storage in a different DS unit when the slice format indicator indicates slices rather than sub-slices. As another example, the processing module dispersed storage error encodes the pillar 2 encoded data slices to produce sub-slices for storage in a different DS unit when the slice format indicator indicates sub-slices rather than slices.

FIG. 15B is a flowchart illustrating another example of migrating data. The method begins with step 232 where a processing module determines whether encoded data slices are missing based on one or more of a query, a flag, a command, a message, a predetermination, a list, a comparison of a stored checksum to a calculated checksum, a comparison of a stored integrity test value to a re-calculated integrity test value, and a comparison of a portion of a dispersed storage (DS) unit source name list associated with a first pillar to a source name list from another DS unit associated with another pillar. Note that the processing module may initiate such a determination based on one or more of a power up sequence detection indicator, a network restoration indicator, a maintenance cycle completion indicator, a repair complete indicator, a command, a message, a timer expiration since the last evaluation, and a predetermination. The method branches to step 236 when the processing module determines that encoded data slices are missing. The method ends at step 234 when the processing module determines that encoded data slices are not missing.

The method continues at step 236 where the processing module determines whether encoded data slices were re-dispersed when encoded data slices are missing. Such a determination may be based on one or more of a flag, a command, a message, a predetermination, a list, a locally stored value, and a virtual dispersed storage network (DSN) address to physical location table lookup. The method branches to step 240 when the processing module determines that the encoded data slices were not re-dispersed. The method continues to step 238 when the processing module determines that the encoded data slices were re-dispersed.

The method continues at step 238 where the processing module determines the re-dispersal parameters (e.g., how and where the slices were re-dispersed). Such a determination may be based on one or more of retrieval of a slice format indicator (e.g., slices or sub-slices), re-dispersal parameters, retrieval of dispersal parameters, operational parameters, an auxiliary DS unit list, a query, a command, a message, and a predetermination. The method branches to step 242.

The method continues at step 240 where the processing module determines dispersal parameters when the encoded data slices were not re-dispersed. The processing module determines the dispersal parameters (e.g., error coding dispersal storage function parameters) to utilize to dispersed storage error encode encoded slices for storage as re-encoded data slices for each pillar such that the re-encoded data slices from at least a decode threshold number of pillars can be subsequently retrieved and dispersed storage error decoded to re-create at least one missing encoded data slice.

The method continues at step 242 where the processing module retrieves slices (e.g., slices from other pillars, re-dispersed slices from auxiliary DS units, sub-slices from auxiliary DS units) from the DS units corresponding to the missing slices. For example, the processing module provides re-dispersed slices as-is when the retrieved slices are re-dispersed slices. As another example, the processing module retrieves at least a decode threshold number of sub-slices from auxiliary DS units, de-slices and decodes the sub-slices, and then re-encodes and re-slices to produce slices of the missing slices when the slices are sub-slice. As yet another example, the processing module retrieves at least a decode threshold number of slices from DS units of other pillars, de-slices and decodes the slices from other pillars, and then re-encodes and re-slices to produce slices of the missing slices when the slices are slices stored on other pillars.

The method continues at step 244 where the processing module facilitates storage of the slices in a DS unit that has the missing slices. Note that the processing module stores the retrieved re-dispersed slices as-is when the slice format indicator indicates slices rather than sub-slices or slices from other pillars. In addition, the processing module may send a delete command to the auxiliary DS units and/or the DS units of other pillars to delete the recently retrieve slices once the missing slices have been re-created and stored on the DS unit.

FIG. 16A is a flowchart illustrating an example of replicating an encoded data slice. The method begins with step 246 where a processing module detects an off-line dispersed storage (DS) unit. Such a detection may be based on one or more of a detection of a DS unit failure, detection of a DS unit shutdown, detection of a DS unit maintenance cycle, detection of a network failure, an error message, a power indicator, a weather indicator, an earthquake indicator, and estimated future availability indicator, a command, a message, a query, a flag, and a predetermination.

The method continues at step 248 where the processing module determines whether to replicate encoded data slices to one or more other DS units. Such a determination may be based on one or more of a failure type, a detection of a DS unit failure, detection of a DS unit shutdown, detection of a DS unit maintenance cycle, detection of a network failure, an error message, a power indicator, a weather indicator, an earthquake indicator, and estimated future availability indicator, a command, a message, a query, a flag, and a predetermination. For example, the processing module determines to replicate encoded data slices when a power outage may last for five hours as signaled by the power indicator. The method branches to step 252 when the processing module determines to replicate. The method continues to step 250 when the processing module determines not to replicate. The method ends at step 250.

The method continues at step 252 where the processing module determines which of the encoded data slices to replicate by sending encoded data slices to at least one other DS unit. Such a determination may be based on one or more of a query response, a flag, a command, a message, a predetermination, a critical information indicator, a frequency of access indicator, an estimated time to complete replication indicator, a priority indicator, and a performance indicator. For example, the processing module determines to replicate the most critical slices as determined by the critical information indicator. As another example, the processing module determines to replicate slices that are accessed most often as indicated by the frequency of access indicator.

The method continues at step 254 where the processing module determines replication parameters (e.g., dispersed storage error coding parameters) to utilize in the replication process. Such replication parameters may include one or more of a pillar width, a write threshold, a read threshold, a decode threshold, encoding method, decoding method, an encryption method, a decryption method, a key, other DS units of the other pillars of the storage set of the DS unit, and auxiliary DS unit choices. Such a determination of the replication parameters may be based on one or more of a candidate auxiliary DS unit list, candidate auxiliary DS unit performance history information, candidate auxiliary DS unit reliability history information, a candidate auxiliary DS unit status indicator, a query response, a flag, a command, a message, a predetermination, a critical information indicator, a frequency of access indicator, an estimated time to complete replication indicator, a priority indicator, and a performance indicator. For example, the processing module determines the replication parameters to include a particular auxiliary DS unit where the auxiliary DS unit has an above average performance history as indicated by the candidate auxiliary DS unit performance history information.

The method continues at step 256 where the processing module facilitates replication of encoded data slices to the auxiliary DS units. For example, the processing module retrieves encoded data slices of other pillars from other DS units of a DS unit storage set, de-slices and decodes the slices to produce a data segment, re-encodes and re-slices the data segment to produce replicated slices of the slices to be replicated. Next, the processing module sends the replicated slices to the auxiliary DS units with a store command to store the replicated slices. Note that the processing module may update a virtual dispersed storage network (DSN) address to physical location table to enable subsequent retrieval of the replicated slices when the DS unit is back online.

FIG. 16B is a flowchart illustrating another example of migrating data, which includes similar steps to FIG. 15B. The method begins with step 232 of FIG. 15B where a processing module determines whether slices are missing. The method branches to step 262 when the processing module determines that slices are missing. The method ends at step 260 when the processing module determines that slices are not missing. The method continues at step 262 where the processing module determines whether slices were replicated. Such a determination may be based on one or more of a flag, a command, a message, a predetermination, a list, a locally stored value, and a virtual DSN address to physical location table lookup. The method branches to step 266 when the processing module determines that the slices were not replicated. The method continues to step 264 when the processing module determines that the slices were replicated.

The method continues at step 264 where the processing module determines replication parameters (e.g., how and where the slices were replicated) when the processing module determines that slices were replicated. Such a determination may be based on one or more of retrieval of replication parameters, operational parameters, an auxiliary DS unit list, a query, a command, a message, and a predetermination. The method branches to step 242.

The method continues at step 266 where the processing module determines operational parameters (e.g., dispersed storage error coding parameters) when the processing module determines that slices were not replicated. The processing module determines the operational parameters to include parameters recently utilized to create the slices. The method continues with step 242 FIG. 15B where the processing module retrieves and processes the slices and then continues with step 244 of FIG. 15B to facilitate storage of the slices.

Figure 17:
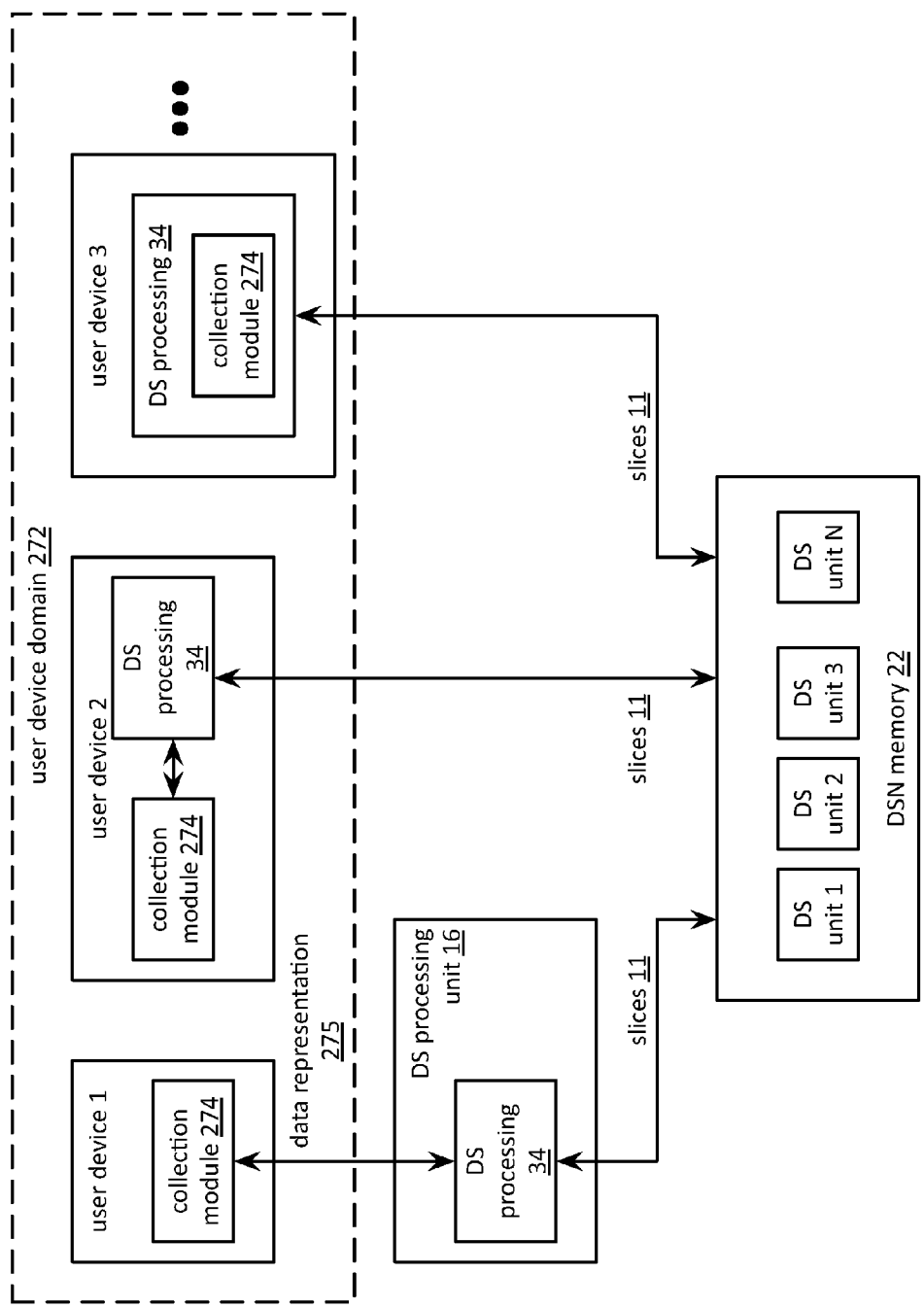
FIG. 17 is a schematic block diagram of another embodiment of a computing system in accordance with the invention.

FIG. 17 is a schematic block diagram of another embodiment of a computing system that includes a user device domain 272, a dispersed storage (DS) processing unit 16, and a dispersed storage network (DSN) memory 22. The user device domain 272 includes user devices 1-3. Note that the user device domain 272 may include any number of user devices. The DS processing unit 16 includes a DS processing 34 and the DSN memory 22 includes a plurality of DS units 1-N. Such user devices 1-3 of the user device domain 272 are associated with a common user such that data, information, and/or messages traversed by the user devices 1-3 share relationship with the common user. The DS processing unit 16 provides user device 1 access to the DSN memory 22 when the user device 1 does not include a DS processing 34.

The user devices 1-3 may include fixed or portable devices as discussed previously (e.g., a smart phone, a wired phone, a laptop computer, a tablet computer, a desktop computer, a cable set-top box, a smart appliance, a home security system, a home automation system, etc.). The user devices 1-3 may include a computing core, one or more interfaces, the DS processing 34 and/or a collection module 274. For example, user device 1 includes the collection module 274. User device 2 includes the collection module 274 and the DS processing 34. User device 3 includes the DS processing 34 which includes the collection module 274. The collection module 274 includes a functional entity (e.g., a software application that runs on a computing core or as part of a processing module) that intercepts user data, processes the user data to produce a data representation, and/or facilitates storage of the data representation in the DSN memory in accordance with one or more of metadata, preferences, and/or operational parameters (e.g., dispersed storage error coding parameters).

In an example operation, the user devices 1-3 traverse the user data from time to time where the user data may include one or more of banking information, home video, video broadcasts, pictures from a user camera, e-mail messages, short message service messages, class notes, website visits, web downloads, contact lists, social networking connections, school grades, medical records, social networking messaging, password lists, and any other user data type associated with the user. Note that the user data may be communicated from one user device to another user device and/or from a user device to a module or unit external to the computing system. Further note that the user data may be stored in any one or more of the user devices 1-3.

In another example of operation, the collection module 274 of user device 1 intercepts medical records that are being processed by user device 1. The collection module 274 determines metadata based on the medical records and determines preferences based on a user identifier (ID). The collection module 274 determines whether to archive the medical records based in part on the medical records, the metadata, and the preferences. The collection module 274 processes the medical records in accordance with the preferences to produce a data representation when the collection module 274 determines to archive the medical records. For example, the collection module 274 of the user device 1 sends the data representation 275 to the DS processing unit 16. The data representation 275 may include one or more of the data, the metadata, the preferences, and storage guidance. The DS processing unit 16 determines operational parameters, creates encoded data slices based on the data representation, and sends the encoded data slices 11 to the DSN memory 22 with a store command to store the encoded data slices 11. As another example, the collection module 274 of the user device 1 determines operational parameters based in part on one or more of the user data, the metadata, the preferences, and the data representation. Next, the collection module 274 sends the data representation 275 to the DS processing unit 16. In this example, the data representation 275 may include one or more of the operational parameters, the metadata, the preferences, and storage guidance. The DS processing unit 16 determines final operational parameters based in part on the operational parameters from the collection module 274, creates encoded data slices based on the data representation and the final operational parameters, and sends the encoded data slices 11 to the DSN memory 22 with a store command to store the encoded data slices 11.

In yet another example of operation, the collection module 274 of user device 2 intercepts banking records that are being viewed by user device 2. The collection module 274 determines metadata based on the banking records and determines preferences based on a user ID. The collection module 274 determines whether to archive the banking records based on the banking records, the metadata, and the preferences. The collection module 274 processes the banking records in accordance with the preferences to produce a data representation when the collection module determines to archive the banking records. For example, the collection module 274 sends the data representation to the DS processing 34 of DS unit 2 such that the data representation may include one or more of the metadata, the preferences, and storage guidance. The DS processing 34 determines operational parameters, creates encoded data slices based on the data representation, and sends the encoded data slices 11 to the DSN memory 22 with a store command to store the encoded data slices 11. As another example, the collection module 274 determines operational parameters based on one or more of the user data (e.g., the banking records), the metadata, the preferences, and the data representation. The collection module 274 sends the data representation to the DS processing 34 of DS unit 2, wherein the data representation includes one or more of the operational parameters, the metadata, the preferences, and storage guidance. The DS processing 34 determines final operational parameters based in part on the operational parameters from the collection module, creates encoded data slices based on the data representation and the final operational parameters, and sends the encoded data slices 11 to the DSN memory 22 with a store command to store the encoded data slices 11.

In a further example of operation, the collection module 274 of user device 3 intercepts home video files that are being processed by user device 3. The collection module 274 determines metadata based on one or more of the home video files and determines preferences based in part on a user ID. The data collection module 274 determines whether to archive the home video files based on the home video files, the metadata, and the preferences. The collection module 274 processes the home video files in accordance with the preferences to produce a data representation when the collection module 274 determines to archive the home video files. For example, the collection module 274 sends the data representation to the DS processing 34 of DS unit 3, wherein the data representation includes one or more of the metadata, the preferences, and storage guidance. The DS processing 34 determines operational parameters, creates encoded data slices based on the data representation and the operational parameters, and sends the encoded data slices 11 to the DSN memory 22 with a store command to store the encoded data slices 11. As another example, the collection module 274 determines operational parameters based on one or more of the user data (e.g., the home video files), the metadata, the preferences, and the data representation. The collection module 274 sends the data representation to the DS processing 34 of DS unit 3, wherein the data representation includes one or more of the operational parameters, the metadata, the preferences, and storage guidance. The DS processing 34 determines final operational parameters based on the operational parameters from the collection module 274, creates encoded data slices based on the data representation and the final operational parameters, and sends the encoded data slices 11 to the DSN memory 22 with a store command to store the encoded data slices 11.

Figure 18:
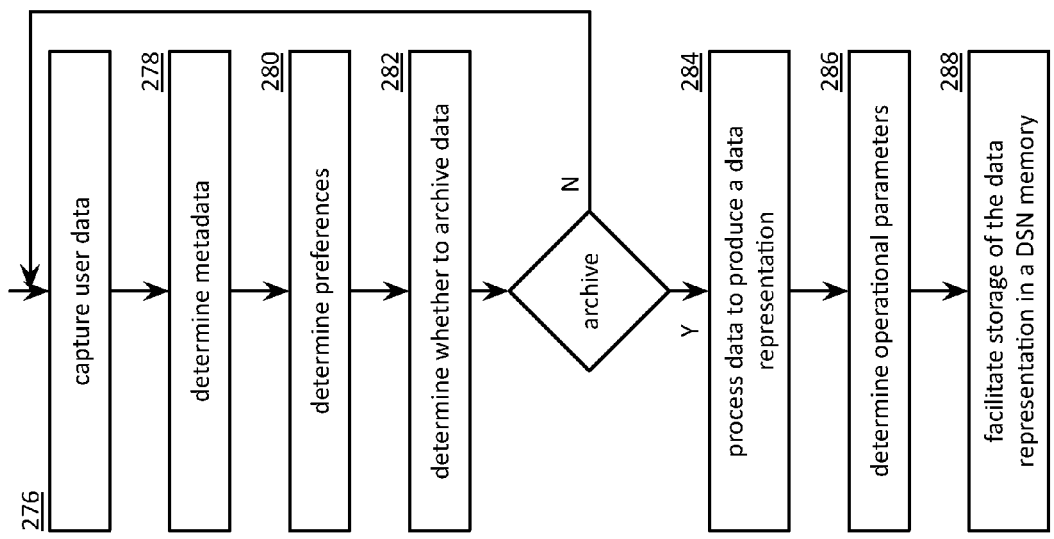
FIG. 18 is a flowchart illustrating an example of archiving data in accordance with the invention.

FIG. 18 is a flowchart illustrating an example of archiving data. The method begins with step 276 where the processing module captures user data. Such capturing may include one or more of monitoring a data stream between a user device and an external entity, monitoring a data stream internally between functional elements within the user device, and retrieving stored data from a memory of the user device. The method continues at step 278 where the processing module determines metadata, wherein the metadata may include one or more of a user identifier (ID), a data type, a source indicator, a destination indicator, a context indicator, a priority indicator, a status indicator, a time indicator, and a date indicator. Such a determination may be based on one or more of the captured user data, current activity or activities of the user device (e.g., active processes, machines state, input/output utilization, memory utilization, etc.), geographic location information, clock information, a sensor input, a user record, a lookup, a command, a predetermination, and message. For example, the processing module determines the metadata to include a banking record data type indicator and a geographic location-based context indicator when the processing module determines the banking data type and geographic location information.

The method continues with step 280 where the processing module determines preferences, wherein the preferences may include one or more of archiving priority by data type, archiving frequency, context priority, status priority, volume priority, performance requirements, and reliability requirements. Such a determination may be based on one or more of the user ID, the user data, the metadata, context information, a lookup, a predetermination, a command, a query response, and a message. The method continues at step 282 where the processing module determines whether to archive data based on one or more of the metadata, context information, a user ID, a lookup, the preferences, and a comparison of the metadata to one or more thresholds. For example, the processing module determines to archive data when the metadata indicates that the user data comprises new banking records. As another example, the processing module determines to not archive data when the metadata indicates that the user data comprises routine website access information. The method repeats back to step 276 when the processing module determines not to archive data. The method continues to step 284 when the processing module determines to archive data.

The method continues at step 284 where the processing module processes the user data to produce a data representation, wherein the data representation may be in a compressed and/or a transformed form to facilitate storage in a dispersed storage network (DSN) memory. The processing module processes the data based on one or more of the captured data, the metadata, the preferences, a processing method table lookup, a command, a message, and a predetermination. For example, the processing module processes the user data to produce a data representation where a size of the data representation facilitates an optimization of DSN memory storage efficiency. For instance, the data representation size may be determined to align with a data segment and data slice sizes such that memory is not unnecessarily underutilized as data blocks are stored in dispersed storage (DS) units of the DSN memory.

The method continues at step 286 where the processing module determines operational parameters. Such a determination may be based on one or more of the data representation, the captured user data, the metadata, the preferences, a processing method table lookup, a command, a message, and a predetermination. For example, the processing module determines a pillar width and decode threshold such that an above average reliability approach to storing the data representation is provided when the processing module determines that the metadata indicates that the user data comprises very high priority financial records requiring a very long term of storage without failure.

The method continues at step 288 where the processing module facilitates storage of the data representation in the DSN memory. For example, the processing module creates dispersed storage error encodes the data representation utilizing the operational parameters to produce encoded data slices. Next, the processing module sends the encoded data slices to the DS units of the DSN memory for storage therein.

Figure 19:
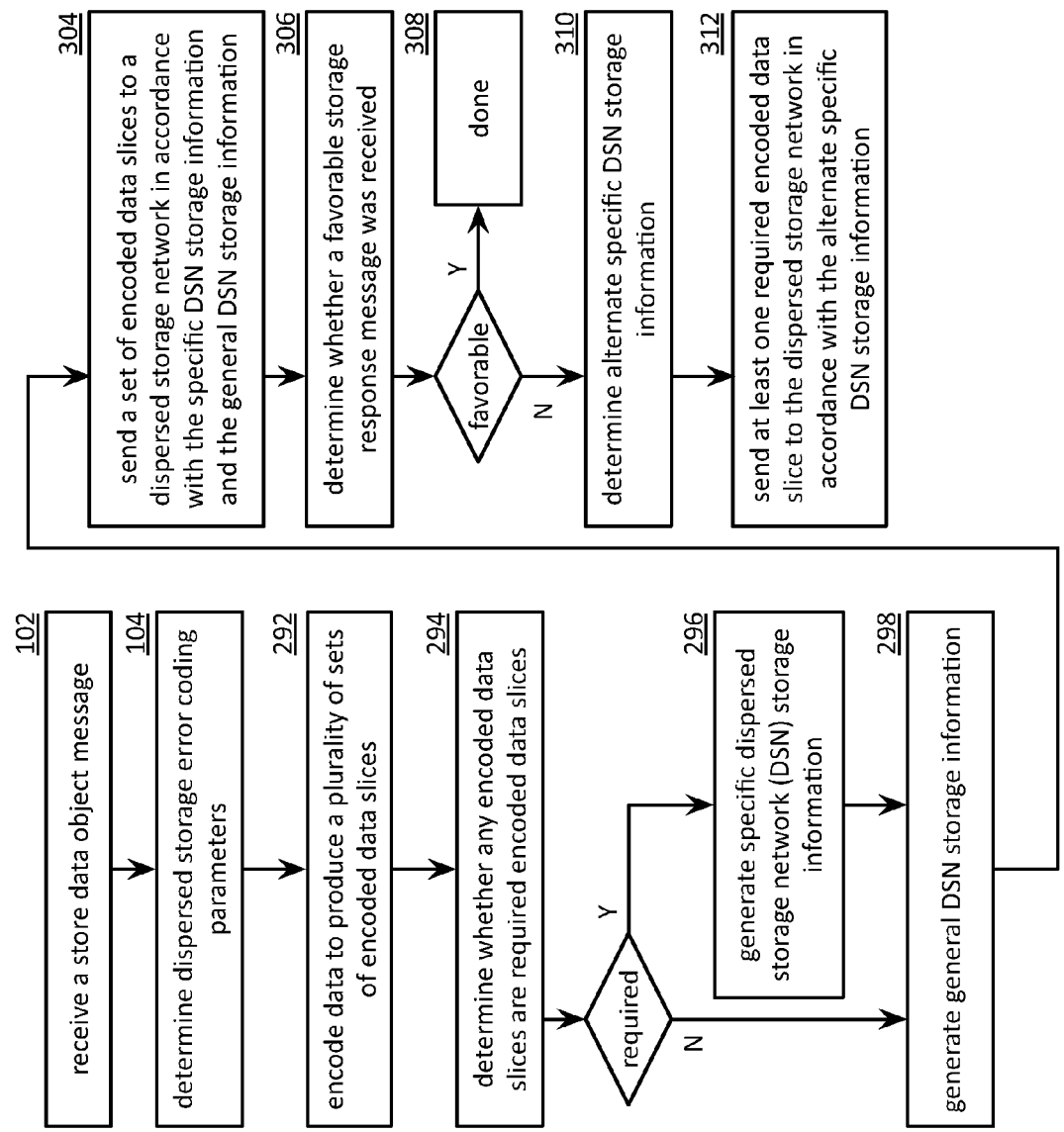
FIG. 19 is a flowchart illustrating another example of storing data in accordance with the invention.

FIG. 19 is a flowchart illustrating another example of storing data, which includes similar steps to FIG. 6. The method begins with steps 102 and 104 of FIG. 6 where a processing module receives a store data object message and determines dispersed storage error coding parameters. The method continues at step 292 where the processing module encodes data to produce a plurality of sets of encoded data slices in accordance with the dispersed storage error coding parameters.

The method continues at step 294 where, for a set of encoded data slices of a plurality of sets of encoded data slices, the processing module determines whether one or more of the encoded data slices of the set of encoded data slices are required encoded data slices to produce one or more required encoded data slices. Such a determination may include one or more of determining a security protocol for the plurality of sets of encoded data slices, wherein the security protocol indicates a use of required encoded data slices and determining a performance protocol for the plurality of sets of encoded data slices, wherein the performance protocol indicates the use of required encoded data slices. Note that the indication of use includes at least one of identifying one or more specific encoded data slices as the one or more required encoded data slices and determining the one or more required data slices based on one or more of selecting one or more dispersed storage error coding parameters, analyzing a dispersed storage (DS) unit operational information, performing a vault lookup, interpreting a storage request message, and interpreting a command.

As an example of step 294, the processing module determines that encoded data slices 1-10 of a set of encoded data slices 1-16 are required encoded data slices when the performance protocol for the plurality of sets of encoded data slices includes an indication of dispersed storage error coding parameters including a pillar width of 16 and a decode threshold of 10. As another example, the processing module determines that encoded data slices 5-8 of the set of encoded data slices 1-6 are required encoded data slices when the security protocol includes an indication that corresponding DS units operational information include a high-security indicator. The method branches to step 298 when the processing module determines that none of the encoded data slices are required encoded data slices. The method continues to step 296 when the processing module determines that at least one of the encoded data slices is a required encoded data slice.

At step 296 the processing module generates specific dispersed storage network (DSN) storage information for each of the one or more required encoded data slices. The specific DSN storage information includes for a first one of the one or more required encoded data slices, a first DS unit identification code, a first slice name, and a first instruction to store the first one of the one or more required encoded data slices based on the first slice name at a first DS unit that corresponds to the first DS unit identification code and for a second one of the one or more required encoded data slices, a second DS unit identification code, a second slice name, and a second instruction to store the second one of the one or more required encoded data slices based on the second slice name at a second DS unit that corresponds to the second DS unit identification code. For example, the processing module generates specific DSN storage information for required encoded data slices that includes for the first one of the one or more required encoded data slices a first DS unit identification code of 1, a first slice name of 457, and a first instruction to store the first one of the one or more required encoded data slices in a mandatory fashion and for the second one of the one or more required encoded data slices a second DS unit identification code of 2, a second slice name of 458, and a second instruction to store the second one of the one or more required encoded data slices in a priority fashion.

The method continues at step 298 where the processing module generates general DSN storage information for remaining encoded data slices of the set of encoded data slices. The general DSN storage information includes identification codes for a set of DS units and an instruction to store the remaining encoded data slices in the set of DS units. For example, the processing module generates general DSN storage information for the remaining encoded data slices of the set of encoded data slices to include identification codes 11-16 for DS units 11-16 and an instruction to store the remaining encoded data slices in DS units 11-16 utilizing a best effort storage approach.

The method continues at step 304 where the processing module sends the set of encoded data slices to a DSN memory in accordance with the specific DSN storage information and the general DSN storage information. In addition, the processing module may append additional data (e.g., a data storage priority, a data storage approach, a data type indicator, the specific DSN storage information, the general DSN storage information) to at least one of the one or more required encoded data slices prior to sending a set of encoded data slices. For example, the processing module sends required encoded data slice 1 to DS unit 1, required encoded data slice 2 to DS unit 2, required encoded data slice 3 to DS unit 3, through required encoded data slice 10 to DS unit 10, in accordance with the specific DSN storage information and encoded data slices 11-16 to any DS unit of DS units 16, 20, 33, 38, 51, and 60 in accordance with the general DSN storage information when a pillar width is 16 and a decode threshold is 10.

The method continues at step 306 where the processing module determines whether a favorable storage response message was received within a storage time period for the one or more required encoded data slices. Note that an unfavorable storage response message may include an indication of one or more of a transaction conflict, a slice name associated with the required encoded data slices locked, and addressing error, an expected slice revision is not present, and an unauthorized request. Further note that a favorable storage response message may include an indication of no error and/or operation succeeded. The method branches to step 310 when the processing module determines that the favorable storage response message was received within the storage time period. The method continues to step 308 where the method ends when the processing module determines that the favorable storage response message was received within the storage time period.

The method continues at step 310 where the processing module determines alternate specific DSN storage information for at least one of the one or more required encoded data slices. For example, the processing module determines the alternate specific DSN storage information to include sending required encoded data slice 10 to DS unit 20 when a favorable storage response message was not received from DS unit 10 within the storage time period. As another example, the processing module determines the alternate specific DSN storage information to include changing required encoded data slice 10 to be not required encoded data slice 10 and changing not required encoded data slice 11 to be required encoded data slice 11 to be stored at DS unit 10. The method continues at step 312 where the processing module sends the at least one of the one or more required encoded data slices to the dispersed storage network in accordance with the alternate specific DSN storage information. For example, the processing module sends encoded data slice 10 to DS unit 20. As another example, the processing module sends encoded data slice 11 to DS unit 10.

Figure 20:
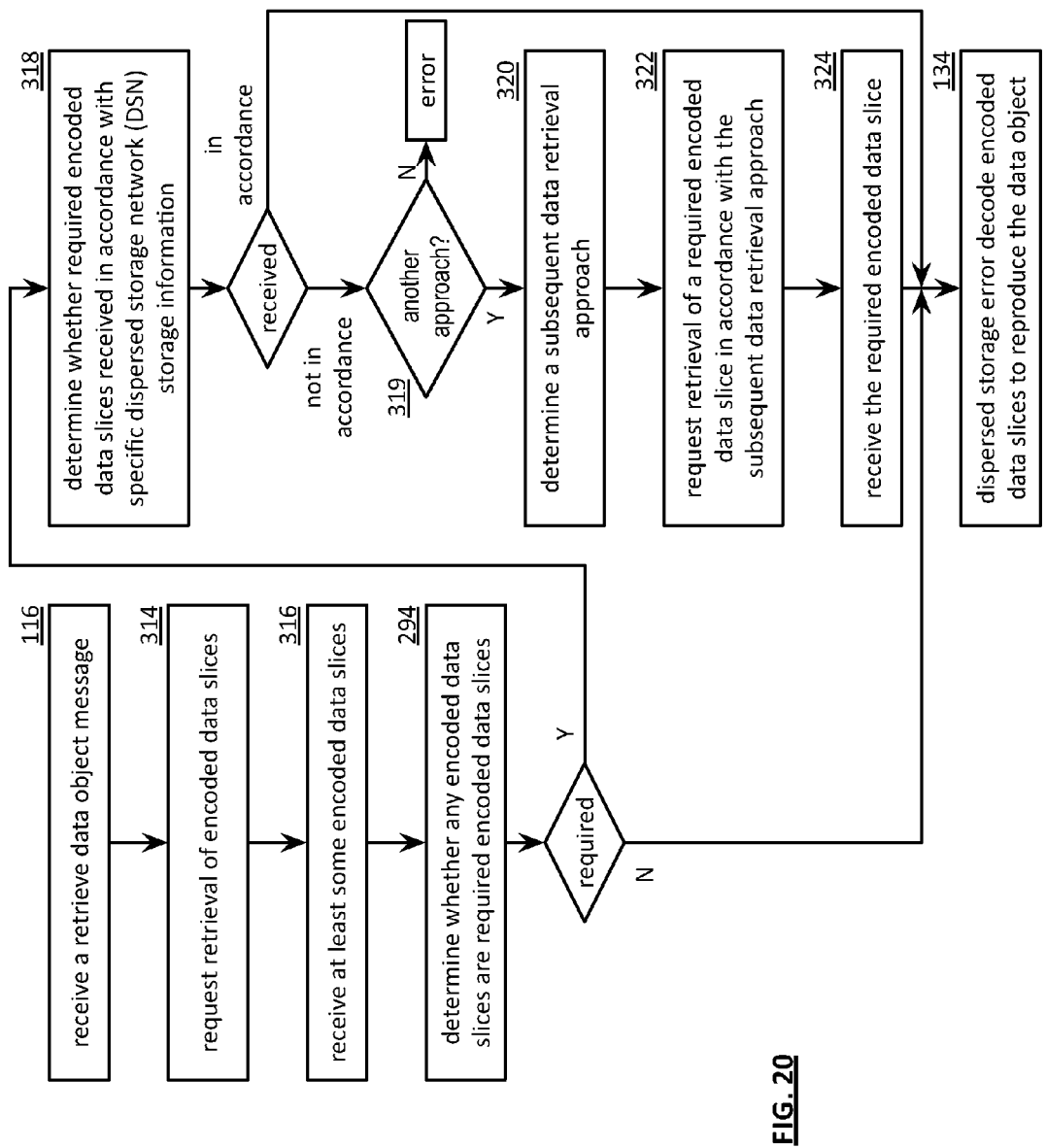
FIG. 20 is a flowchart illustrating an example of retrieving data in accordance with the invention.

FIG. 20 is a flowchart illustrating an example of retrieving data, which includes similar steps to FIGS. 7 and 19. The method begins with step 116 of FIG. 7 where a processing module receives a retrieve data object message and continues with step 314 where the processing module requests retrieval of encoded data slices associated with the retrieve data object message. The method continues at step 316 where the processing module receives at least some encoded data slices of a set of encoded data slices of a plurality of sets of encoded data slices. The method continues at step 294 of FIG. 19 where the processing module determines whether any encoded data slices are required encoded data slices. The method branches to step 134 of FIG. 7 when the processing module determines that none of the encoded data slices are required encoded data slices. The method continues to step 318 when the processing module determines that at least one encoded data slice is a required encoded data slice.

At step 318 the processing module determines whether the one or more required encoded data slices was received in accordance with specific dispersed storage network (DSN) retrieval information. For example, the processing module determines that the one or more required encoded data slices were received in accordance with the specific DSN retrieval information when each of the required encoded data slices was received from an expected corresponding DS unit of the specific DSN retrieval information. The method branches to step 134 of FIG. 7 when the processing module determines that the required encoded data slices were received in accordance with the specific DSN storage information. The method continues to step 319 when the processing module determines that the required encoded data slices were not received in accordance with the specific DSN storage information.

At step 319, the processing module determines whether there is another approach to receiving required encoded data slices is available. If not, an error is generated. If yes, the method continues at step 320 where the processing module determines a subsequent data retrieval approach based on the specific DSN retrieval information. Such determining includes one or more of determining to re-request retrieval of the at least one of the one or more required encoded data slices, determining whether the specific DSN retrieval information includes alternate specific DSN retrieval information, and determining whether a lower quality data retrieval method is allowed. For example, the processing module determines the subsequent data retrieval approach to include re-requesting retrieval of the least one of the one or more required encoded data slices when the specific DSN retrieval information requires specific slices to be retrieved from specific DS units. As another example, the processing module determines the subsequent data retrieval approach to include requesting retrieval of an alternate encoded data slice as a required encoded data slice from an alternate DS unit when the processing module determines that the specific DSN retrieval information includes alternate specific DSN retrieval information including a slice name of the alternate encoded data slice and an identifier code of the alternate DS unit.

The method continues at step 322 where the processing module requests retrieval of the at least one of the one or more required encoded data slices in accordance with the subsequent data retrieval approach. For example, the processing module requests re-retrieval of the required encoded data slice when the subsequent data retrieval approach includes re-requesting retrieval of the required encoded data slice. As another example, the processing module requests retrieval of the alternate encoded data slice when the subsequent data retrieval approach includes requesting an alternate encoded data slice as the required encoded data slice. The method continues at step 324 where the processing module receives the required encoded data slice. The method continues at step 134 of FIG. 7 where the processing module dispersed storage error decodes encoded data slices to reproduce the data object.

Figure 21:
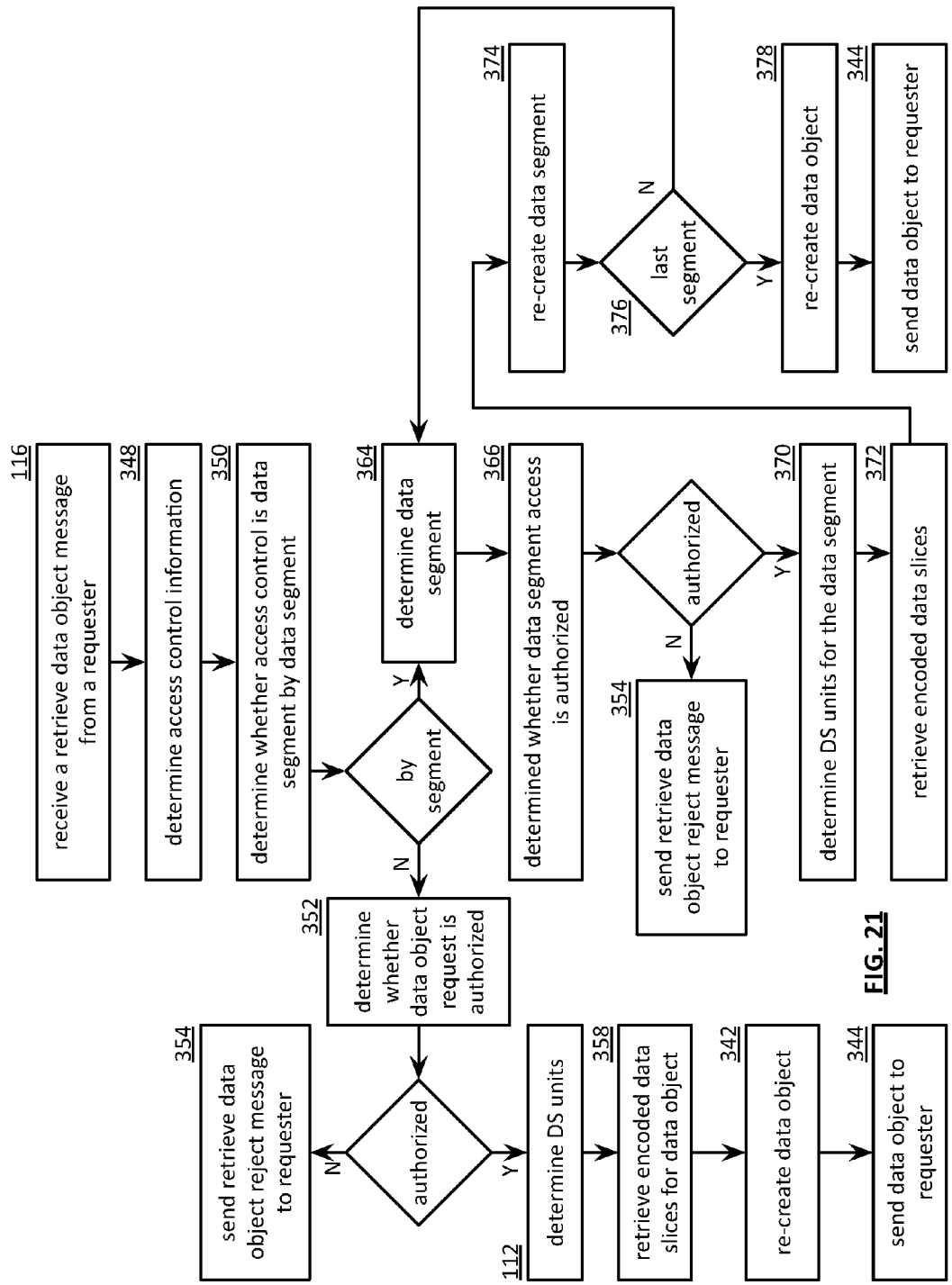
FIG. 21 is a flowchart illustrating another example of retrieving data in accordance with the invention.

FIG. 21 is a flowchart illustrating another example of retrieving data, which includes similar steps to FIGS. 6 and 7. The method begins with step 116 of FIG. 7 where a processing module receives a retrieve data object message from a requester. The method continues with step 348 where the processing module determines access control information, wherein such access control information may indicate one or more of access control by data object, access control by data segment, access control by data segment and by slice name, access by user identifier (ID), access by group ID, maximum number of allowed access sequences, and cumulative number of access sequences. Such a determination may be based on one or more of information received in the retrieve data object message, a user ID, a group ID, a data object name, a segment ID, a segment count, the slice name, a data type, a vault lookup, an access control list lookup, an access control list query, a command, a message, and a predetermination. For example, the processing module determines that the access control information indicates that access to the data object is controlled on a data segment by data segment basis where access is controlled for each data segment of the data object. Note that data segments of the same data object may be stored in two or more DS unit storage sets when the access control is data segment by data segment.

The method continues at step 350 where the processing module determines whether access control is data segment by data segment based on the access control information. The method branches to step 364 when the processing module determines that access control is data segment by data segment. The method continues to step 352 when the processing module determines that access control is not data segment by data segment (e.g., access control may be by data object). At step 352 the processing module determines whether the data object request is authorized based on one or more of information in the retrieve data object message, the access control information, an access control list lookup, an access control list query, an access control list update, a vault lookup, a command, a message, and predetermination. For example, the processing module determines that the data object request is authorized when a user ID associated with the request matches a user ID on an access control list that is allowed to access the requested data object. The method branches to step 112 of FIG. 6 when the processing module determines that the data object request is authorized. The method ends with step 354 where the processing module sends a retrieve data object reject message to the requester when the processing module determines that the data object request is not authorized.

At step 112 the processing module determines dispersed storage (DS) units of a DS unit storage set. The method continues at step 358 where the processing module retrieves encoded data slices corresponding to the data object from the DS units of the DS unit storage set. The method continues at step 354 where the processing module dispersed storage error decodes at least a decode threshold number of encoded data slices per set of a plurality of sets of encoded data slices corresponding to the data object to produce a plurality of data segments, aggregating the plurality of data segments to recreate the data object. The method continues at step 344 where the processing module sends the data object to the requester.

At step 364 the processing module determines a data segment when the processing module determines that access control is data segment by data segment. For example, the processing module starts with a first data segment of the data object. The method continues at step 366 for the processing module determines whether access of the data segment is authorized based on a comparison of a data segment ID to an access control list comprising at least a list of authorized data segment IDs associated with the requester (e.g., by user ID and/or by group ID). The method branches to step 370 when the processing module determines that access to the data segment is authorized. The method continues to step 354 when the processing module determines that access to the data segment is not authorized. The method ends with step 354 where the processing module sends the retrieve data object reject message to the requester.

At step 370 the processing module determines DS units that correspond to where encoded data slices are stored for the data segment based on one or more of a data object name to source name/slice name conversion (e.g., a translation of the data object name to a virtual dispersed storage network (DSN) address), a virtual DSN address to physical location table lookup, a command, a message, and predetermination. Note that two or more of the data segments of the data object may be stored in different DS unit storage sets. The processing module may determine dispersed storage error coding parameters based on one or more of the user ID, a data object ID, a data segment ID, the present data segment ID, a slice name, information received in the retrieve data object message, an individual user vault lookup, a group vault lookup, a list, a table, a command, a message, and a predetermination. Note that two or more of the data segments of the data object may utilize different dispersed storage error coding parameters.

The method continues at step 372 where the processing module retrieves encoded data slices from at least a decode threshold number of DS units of the DS unit storage set associated with the data segment by sending retrieve encoded data slice commands to the DS units and receiving encoded data slices in response. The method continues at step 374 where the processing module dispersed storage error decodes at least a decode threshold number of encoded data slices to re-create the data segment. The method continues at step 376 where the processing module determines whether a last segment a plurality of data segments of the data object has been recreated (e.g., all of the segments) based on comparing a number of re-created data segments to a number of data segments associated with the data object. The method repeats back steps 364 when the processing module determines that the last data segment has not been re-created. The method continues to step 378 when the processing module determines that the last segment has been re-created. At step 378 the processing module aggregates the re-created data segments to re-create the data object. The method continues at step 344 where the processing module sends the data object to the requester.

Figure 22:
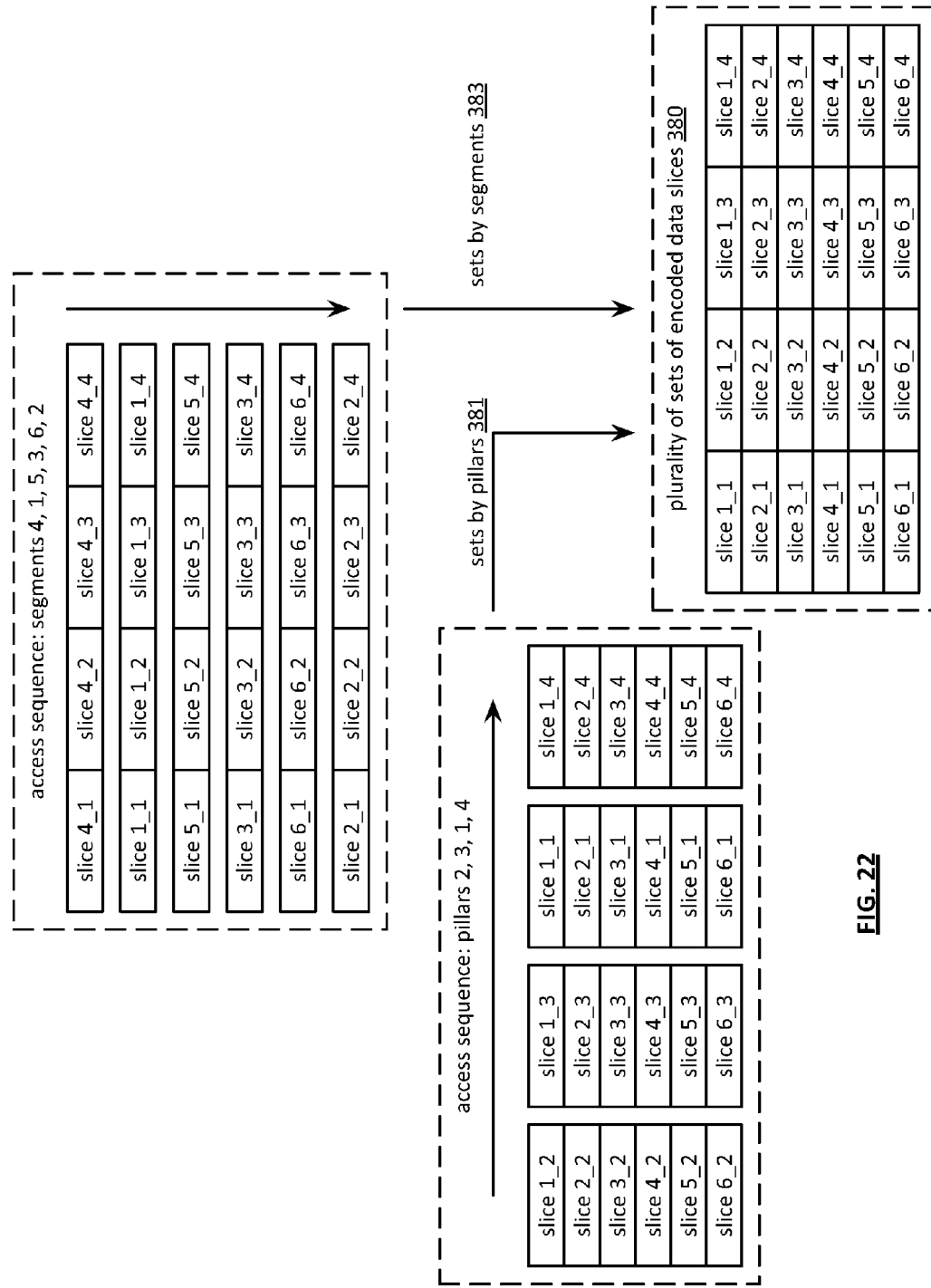
FIG. 22 is a diagram illustrating an example of encoded data slice access sequences in accordance with the invention.

FIG. 22 is a diagram illustrating an example of encoded data slice access sequences that includes a representation of an access sequence of pillars 2, 3, 1, and 4, a representation of an access sequence of segments 4, 1, 5, 3, 6, and 2, and a representation of an ordered plurality of sets of encoded data slices 380. Such access sequences may be utilized to provide the ordered plurality of sets of encoded data slices 380. Note that a set of encoded data slices may include encoded data slices of a data segment of a plurality of data segments of a data file and encoded data slices of the plurality of data segments having a common pillar number.

The access sequence of pillars 2, 3, 1, and 4 implies that encoded slices of pillar 2 are accessed first, encoded data slices of pillar 3 are accessed second, encoded data slices of pillar 1 are accessed third, and encoded data slices of pillar 4 are accessed fourth. Sequencing of encoded data slices of a common pillar includes one of an ordered sequence, a random sequence, and a pseudorandom sequence. For example, any encoded data slice of encoded data slices of pillar 3 may be accessed in any order when the sequencing of the encoded data slices of pillar 3 includes a random sequence. As another example, encoded data slices of pillar 3 may be accessed in an order of slice 1_3, slice 2_3, slice 3_3, slice 4_3, slice 5_3, and slice 6_3 when the sequencing of encoded data slices of pillar 3 includes an ordered sequence of slice 1_3, slice 2_3, slice 3_3, slice 4_3, slice 5_3, and slice 6_3. The sequencing of slices when utilizing the access sequence of pillars 2, 3, 1, and 4 produces sets of encoded data slices by pillars 381. The sets of encoded data slices by pillars 381 are utilized to produce the plurality of sets of encoded data slices 380 such that encoded data slices are organized both by segment and by pillar. For example, slices 1-6 of pillar 2 are accessed first to fill in a second column of the plurality of sets of encoded data slices 380, slices 1-6 of pillar 3 are accessed second to fill in a third column of the plurality of sets of encoded data slices 380, slices 1-6 of pillar 1 are accessed third to fill in a first column of the plurality of sets of encoded data slices 380, and slices 1-6 of pillar 4 are accessed fourth to fill in a fourth column of the plurality of sets of encoded data slices 380.

The access sequence of segments 4, 1, 5, 3, 6, and 2 implies that encoded slices of segment 4 are accessed first, encoded data slices of segment 1 are accessed second, encoded data slices of segment 5 are accessed third, encoded data slices of segment 3 are accessed fourth, encoded data slices of segment 6 are accessed fifth, and encoded data slices of segment 2 are accessed sixth. Sequencing of encoded data slices of a common segment includes one of an ordered sequence, a random sequence, and a pseudorandom sequence. For example, any encoded data slice of encoded data slices of segment 4 may be accessed in any order when the sequencing of the encoded data slices of segment 4 includes a random sequence. As another example, encoded data slices of segment 4 may be accessed in an order of slice 4_1, slice 4_2, slice 4_3, and slice 4_4 when the sequencing of encoded data slices of segment 4 includes an ordered sequence of slice 4_1, slice 4_2, slice 4_3, and slice 4_4. The sequencing of slices when utilizing the access sequence of segments 4, 1, 5, 3, 6, and 2 produces sets of encoded data slices by segments 383. The sets of encoded data slices by segments 383 are utilized to produce the plurality of sets of encoded data slices 380 such that encoded data slices are organized both by segment and by pillar. For example, slices 1-4 of segment 4 are accessed first to fill in a fourth row of the plurality of sets of encoded data slices 380, slices 1-4 of segment 1 are accessed second to fill in a first row of the plurality of sets of encoded data slices 380, slices 1-4 of segment 5 are accessed third to fill in a fifth row of the plurality of sets of encoded data slices 380, slices 1-4 of segment 3 are accessed fourth to fill in a third row of the plurality of sets of encoded data slices 380, slices 1-4 of segment 6 are accessed fifth to fill in a sixth row of the plurality of sets of encoded data slices 380, and slices 1-4 of segment 2 are accessed sixth to fill in a second row of the plurality of sets of encoded data slices 380.

Figure 23:
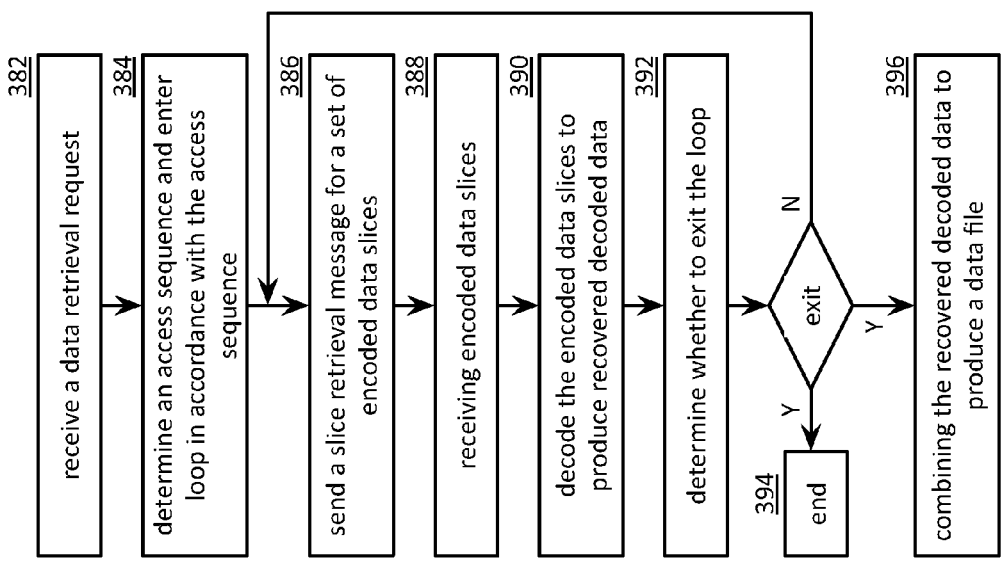
FIG. 23 is a flowchart illustrating another example of retrieving data in accordance with the invention.

FIG. 23 is a flowchart illustrating another example of retrieving data. The method begins with step 382 where a processing module receives a data retrieval request to retrieve data stored as a plurality of sets of encoded data slices in a dispersed storage network (DSN) memory, wherein the data retrieval request includes a data identifier (ID). Note that the set of encoded data slices includes at least one of encoded data slices of a data segment of a plurality of data segments of a data file and encoded data slices of the plurality of data segments having a common pillar number.

The method continues at step 384 where the processing module determines an access sequence for retrieving the plurality of sets of encoded data slices based on the data ID. Such an access sequence includes at least one of a series of ordered slice names of the plurality of sets of slice names, a series of ordered segment identification codes, and a series of ordered pillar identification codes. Such a determination may be based on at least one of the data ID, a requester ID, a source name, a data type indicator, a vault lookup, a predetermination, a command, a message, a dispersed storage (DS) processing unit ID, a priority indicator, a performance indicator, and a reliability indicator. For example, the processing module determines the access sequence based on a vault lookup utilizing the requester ID as an index for the vault lookup. As another example, the processing module determines the access sequence based on a vault lookup utilizing the data ID as an index for the vault lookup. As yet another example, the processing module determines access sequence based on a vault lookup utilizing the data ID and the requester ID as indexes for the vault lookup.

The method continues at step 386 where the processing module sends a slice retrieval message for a set of encoded data slices of the plurality of sets of encoded data slices. The method continues with step 388 where the processing module receives at least a decode threshold number of encoded data slices of the set to produce received encoded data slices when the set of encoded data slices or a previous set of encoded data slices is requested in accordance with a system maintained access sequence (e.g., an allowed access sequence). Note that encoded data slices may not be available for receiving when the encoded data slices are not requested in accordance with the system maintained access sequence (e.g., not sent from a dispersed storage (DS) unit). The method continues at step 390 where the processing module dispersed storage error decodes the received encoded data slices to produce recovered decoded data.

The method continues at step 392 where the processing module determines whether to exit the loop. The method repeats back to step 386 to repeat the loop when the set of encoded data slices is not a last set of the plurality of sets of encoded data slices and when the request of the set of encoded data slices and a previous set of encoded data slices are requested in accordance with the system maintained access sequence (e.g., in order of the system maintained access sequence). The method branches to step 396 to exit the loop when the set of encoded data slices is the last set of the plurality of sets of encoded data slices. The method continues to step 394 where the process ends when the processing module determines to exit the loop when the set of encoded data slices or the previous set of encoded data slices is not requested in accordance with the system maintained access sequence. The method continues at step 396 where the processing module combines the recovered decoded data to produce a data file when the set of encoded data slices is the last set of the plurality of sets of encoded data slices.

Figure 24:
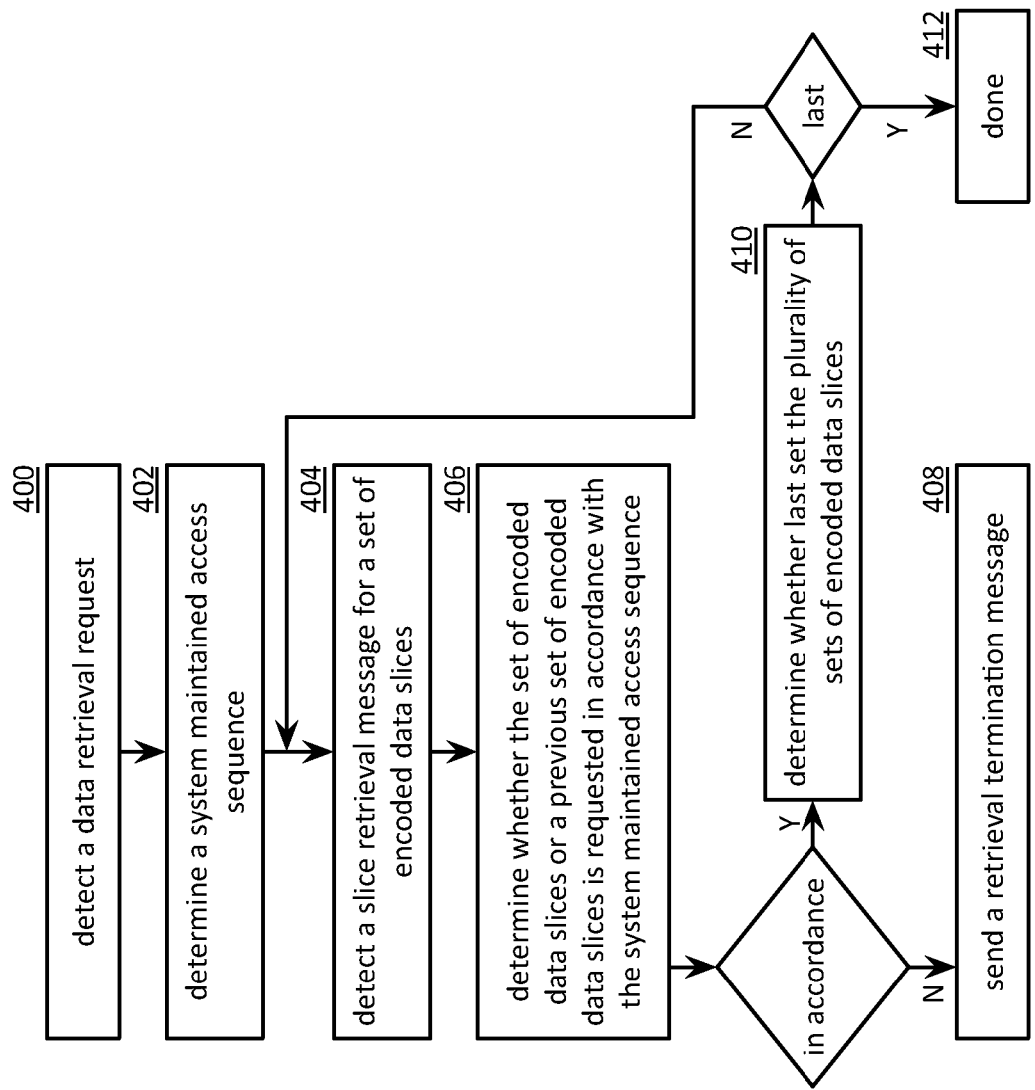
FIG. 24 is a flowchart illustrating an example of verifying a retrieval sequence in accordance with the invention.

FIG. 24 is a flowchart illustrating an example of verifying a retrieval sequence. The method begins with step 400 where a processing module detects a data retrieval request regarding retrieval of data stored as a plurality of sets of encoded data slices in a dispersed storage network (DSN) memory. Such detecting may include receiving a slice retrieval indicator message from a DS unit, wherein the slice retrieval indicator message may include one or more of a user identifier (ID), a source name, a slice name, a timestamp, a data type, a dispersed storage (DS) processing unit ID, input access sequence information, a priority indicator, a performance indicator, and a reliability indicator. Note that the slice names and timestamps may include references to a previous two or more retrievals processed by a same DS processing unit for a same user. Further note that the two or more retrievals may indicate a portion of a retrieval sequence. Note that a set of encoded data slices includes at least one of encoded data slices of a data segment of a plurality of data segments of a data file and encoded data slices of the plurality of data segments having a common pillar number.

The method continues at step 402 where the processing module determines a system maintained access sequence for retrieving the plurality of sets of encoded data slices based on the data retrieval request. Such a system maintained access sequence includes at least one of a series of ordered slice names of the plurality of sets of slice names, a series of ordered segment identification codes, and a series of ordered pillar identification codes. Such a determination may be based on at least one of the data ID, a requester ID, a source name, a data type indicator, a vault lookup, a predetermination, a command, a message, a DS processing unit ID, a priority indicator, a performance indicator, and a reliability indicator.

The method continues at step 404 where the processing module detects a slice retrieval message for a set of encoded data slices of the plurality of sets of encoded data slices. The method continues at step 406 where the processing module determines whether the set of encoded data slices or a previous set of encoded data slices is requested in accordance with the system maintained access sequence. Such a determination may be based on determining whether the set of encoded data slices or the previous set of encoded data slices is requested in accordance with the system maintained access sequence, including extracting temporal retrieval information (e.g., timestamps) of the set of encoded data slices and the previous set of encoded data slices, ordering the set of encoded data slices and the previous set of encoded data slice in accordance with the temporal retrieval information to produce an actual access sequence, and comparing the system maintained access sequence with the actual access sequence. For example, the processing module determines that the set of encoded data slices or the previous set of encoded data slices is requested in accordance with the system maintained access sequence when the system maintained access sequence substantially includes the actual access sequence so far.

The method branches to step 410 when the processing module determines that the set of encoded data slices or the previous set of encoded data slices is requested in accordance with the system maintained access sequence. The method continues to step 408 when the processing module determines that the set of encoded data slices or the previous set of encoded data slices is not requested in accordance with the system maintained access sequence. The method continues and ends at step 408 where the processing module sends a retrieval termination message to the DSN memory. Such sending of the retrieval termination message to the DSN memory includes at least one of sending the retrieval termination message to one or more DS units (e.g., those being utilized to retrieve the encoded data slices so far), sending the retrieval termination message to a DS processing unit (e.g., a DS processing unit requesting retrieval of the data), and sending the retrieval termination message to a DS managing unit (e.g., to report an error of inappropriate access).

At step 410 the processing module determines whether the set is a last set of the plurality of sets of encoded data slices. The method repeats back to step 404 on the processing module determines that the set of encoded data slices is not the last set of the plurality of sets of encoded data slices and when the request of the set of encoded data slices and the previous set of encoded data slices are retrieved in accordance with the system maintained access sequence. The method ends at step 412 when the processing module determines that the set of encoded data slices is the last set of the plurality of sets of encoded data slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
   dispersed storage error encoding data to produce a plurality of sets of encoded data slices in accordance with dispersed storage error coding parameters;
   determining a plurality of sets of slice names corresponding to the plurality of sets of encoded data slices;
   determining integrity information for the plurality of sets of slice names; and
   sending the plurality of sets of encoded data slices, the plurality of sets of slice names, and the integrity information to a dispersed storage network (DSN) memory for storage therein.

2. The method of claim 1, wherein the determining the integrity information further comprises:
   for a first integrity method:
      generating individual integrity information for at least some of the slice names of at least some of the plurality of sets of slice names; and
      generating the integrity information based on the individual integrity information;
   for a second integrity method:
      generating set integrity information for each set of slice names of at least some of the plurality of sets of slice names; and
      generating the integrity information based on the set integrity information;
   for a third integrity method:
      generating pillar integrity information for each pillar set of slice names of at least some of the plurality of sets of slice names; and
      generating the integrity information based on the pillar integrity information;
   for a fourth integrity method:
      generating data file integrity information for at least some of the plurality of sets of slice names; and
      generating the integrity information based on the data file integrity information; and
   for a fifth integrity method:
      generating combined integrity information for at least some of the encoded data slices of the plurality of sets of encoded data slices and for at least some of the slices names of at least some of the plurality of sets of slice names; and
      generating the integrity information based on the combined integrity information.

3. The method of claim 2 further comprises:
   performing the first integrity method, the fourth integrity method, and at least one of the second and third integrity methods to generate the integrity information.

4. The method of claim 2 further comprises:
for the first integrity method, performing one or more of a hash function, cyclic redundancy check, encryption function, and parity check on a slice name of the at least some of the slice names of at least some of the plurality of sets of slice names to generate the individual integrity information;
for the second integrity method, performing one or more of the hash function, the cyclic redundancy check, the encryption function, and the parity check on the set of slice names of at least some of the plurality of sets of slice names to generate the set integrity information;
for the third integrity method, performing one or more of the hash function, the cyclic redundancy check, the encryption function, and the parity check on the pillar set of slice names of at least some of the plurality of sets of slice names to generate the pillar integrity information;
for the fourth integrity method, performing one or more of the hash function, the cyclic redundancy check, the encryption function, and the parity check on the at least some of the plurality of sets of slice names to generate the data file integrity information; and
for the fifth integrity method, performing one or more of a hash function, cyclic redundancy check, encryption function, and parity check on an encoded data slice of the at least some of the encoded data slices of the plurality of set of encoded data slices and an associated slice name of the at least some of the slice names of the plurality of sets of slice names to generate the combined integrity information.

5. The method of claim 4 further comprises:
the hash function including a hashed message authentication code (HMAC) that uses a shared key; and
the encryption function including an encryption algorithm that utilizes a private key, which is paired to a public key.

6. A computer comprises:
an interface;
a memory; and
a processing module operable to:
dispersed storage error encode data to produce a plurality of sets of encoded data slices in accordance with dispersed storage error coding parameters;
determine a plurality of sets of slice names corresponding to the plurality of sets of encoded data slices;
determine integrity information for the plurality of sets of slice names; and
send, via the interface, the plurality of sets of encoded data slices, the plurality of sets of slice names, and the integrity information to a dispersed storage network (DSN) memory for storage therein.

7. The computer of claim 6, wherein the processing module further functions to determine the integrity information by:
for a first integrity method:
generating individual integrity information for at least some of the slices names of at least some of the plurality of sets of slices names; and
generating the integrity information based on the individual integrity information;
for a second integrity method:
generating set integrity information for each set of slice names of at least some of the plurality of sets of slice names; and
generating the integrity information based on the set integrity information;
for a third integrity method:
generating pillar integrity information for each pillar set of slice names of at least some of the plurality of sets of slice names; and
generating the integrity information based on the pillar integrity information;
for a fourth integrity method:
generating data file integrity information for at least some of the plurality of sets of slice names; and
generating the integrity information based on the data file integrity information; and
for a fifth integrity method:
generating combined integrity information for at least some of the encoded data slices of the plurality of sets of encoded data slices and for at least some of the slices names of at least some of the plurality of sets of slice names; and
generating the integrity information based on the combined integrity information.

8. The computer of claim 7, wherein the processing module further functions to:
perform the first integrity method, the fourth integrity method, and at least one of the second and third integrity methods to generate the integrity information.

9. The computer of claim 7, wherein the processing module further functions to:
for the first integrity method, perform one or more of a hash function, cyclic redundancy check, encryption function, and parity check on a slice name of the at least some of the slices names of at least some of the plurality of sets of slices names to generate the individual integrity information;
for the second integrity method, perform one or more of the hash function, the cyclic redundancy check, the encryption function, and the parity check on the set of slice names of at least some of the plurality of sets of slice names to generate the set integrity information;
for the third integrity method, perform one or more of the hash function, the cyclic redundancy check, the encryption function, and the parity check on the pillar set of slice names of at least some of the plurality of sets of slice names to generate the pillar integrity information;
for the fourth integrity method, perform one or more of the hash function, the cyclic redundancy check, the encryption function, and the parity check on the at least some of the plurality of sets of slice names to generate the data file integrity information; and
for the fifth integrity method, performing one or more of a hash function, cyclic redundancy check, encryption function, and parity check on an encoded data slice of the at least some of the encoded data slices of the plurality of sets of encoded data slices and an associated slice name of the at least some of the slice names of the plurality of sets of slice names to generate the combined integrity information.

10. The computer of claim 9 further comprises:
the hash function including a hashed message authentication code (HMAC) that uses a shared key; and
the encryption function including an encryption algorithm that utilizes a private key, which is paired to a public key.

\* \* \* \* \*